United States Patent
Zhang

(10) Patent No.: US 10,979,870 B1
(45) Date of Patent: Apr. 13, 2021

(54) GEOGRAPHIC PARTITIONING OF EVENT MAPS BASED ON SOCIAL INFORMATION

(71) Applicant: Facebook, Inc., Menlo Park, CA (US)

(72) Inventor: Zhong Zhang, Santa Clara, CA (US)

(73) Assignee: Facebook, Inc., Menlo Park, CA (US)

(*) Notice: Subject to any disclaimer, the term of this patent is extended or adjusted under 35 U.S.C. 154(b) by 333 days.

(21) Appl. No.: 15/961,789

(22) Filed: Apr. 24, 2018

(51) Int. Cl.
| | | |
|---|---|---|
| *G06Q 10/10* | (2012.01) | |
| *G06Q 10/08* | (2012.01) | |
| *G06Q 30/06* | (2012.01) | |
| *G06Q 30/02* | (2012.01) | |
| *G06Q 10/06* | (2012.01) | |
| *H04W 4/18* | (2009.01) | |
| *G06Q 50/00* | (2012.01) | |
| *H04W 4/029* | (2018.01) | |
| *G06F 16/29* | (2019.01) | |

(52) U.S. Cl.
CPC ............ *H04W 4/185* (2013.01); *G06F 16/29* (2019.01); *G06Q 50/01* (2013.01); *H04W 4/029* (2018.02)

(58) Field of Classification Search
CPC ....... G06Q 50/01; G06F 16/29; H04W 4/185; H04W 4/029
USPC .......................................... 705/1.1–912, 319
See application file for complete search history.

(56) References Cited

U.S. PATENT DOCUMENTS

| | | | | |
|---|---|---|---|---|
| 8,467,955 B2* | 6/2013 | Jiang | ...................... | G01C 21/20 340/988 |
| 2009/0106040 A1* | 4/2009 | Jones | ..................... | G06Q 30/02 705/319 |
| 2009/0287687 A1* | 11/2009 | Martire | ................... | G06Q 30/02 |
| 2012/0284333 A1* | 11/2012 | Neff | ......................... | G06F 16/29 709/204 |
| 2013/0060744 A1* | 3/2013 | Roychoudhuri | ....... | G06Q 50/01 707/706 |
| 2013/0080922 A1* | 3/2013 | Elias | ................... | G06Q 10/1095 715/753 |
| 2015/0058345 A1* | 2/2015 | Mishra | ............... | G06Q 30/0261 707/737 |
| 2015/0220835 A1* | 8/2015 | Wilson | ............... | G06Q 30/0282 706/46 |
| 2015/0248651 A1* | 9/2015 | Akutagawa | ............ | G06Q 50/01 705/7.19 |

(Continued)

OTHER PUBLICATIONS

U.S. Appl. No. 15/615,713, filed Jun. 6, 2017, Jaech.

(Continued)

*Primary Examiner* — Jonathan P Ouellette
(74) *Attorney, Agent, or Firm* — Baker Botts L.L.P.

(57) ABSTRACT

In one embodiment, a method includes, by one or more computing devices, receiving, from a client system of a user, a request for event recommendations for the user; accessing information indicating a geographic location associated with the user; accessing a geographic map comprising multiple map tiles, each map tile defining a geographic area within the map; identifying a first map tile of the multiple map tiles associated with the user based on the geographic location associated with the user; and determining a social tile associated with the first map tile, wherein the social tile comprises the first map tile and one or more second map tiles of the multiple map tiles, wherein the first map tile and the one or more second map tiles are clustered into the social tile based on one or more items of prior attendee information corresponding to one or more prior events.

23 Claims, 15 Drawing Sheets

(56) References Cited

U.S. PATENT DOCUMENTS

| | | | |
|---|---|---|---|
| 2016/0005003 A1* | 1/2016 | Norris | H04L 65/403 |
| | | | 705/7.19 |
| 2016/0069704 A1* | 3/2016 | Park | G06F 3/04886 |
| | | | 701/532 |
| 2016/0080438 A1* | 3/2016 | Liang | G06F 16/9537 |
| | | | 715/753 |
| 2016/0358065 A1* | 12/2016 | Gedge | G06Q 10/1095 |
| 2017/0132226 A1 | 5/2017 | Kalis | |
| 2017/0199927 A1 | 7/2017 | Moore | |
| 2018/0014158 A1* | 1/2018 | Campbell | H04L 67/18 |
| 2018/0216946 A1* | 8/2018 | Gueye | G06F 3/04817 |

OTHER PUBLICATIONS

U.S. Appl. No. 15/728,189, filed Oct. 9, 2017, Zeng.
U.S. Appl. No. 15/847,799, filed Dec. 19, 2017, Wang.
U.S. Appl. No. 15/847,818, filed Dec. 19, 2017, Rouhani-Kalleh.
U.S. Appl. No. 15/847,832, filed Dec. 19, 2017, Koolwal.

\* cited by examiner

600

| Map Tile No. | Map Tile ID | | Social Tile No. | Social Tile ID |
|---|---|---|---|---|
| 602a<br>Map Tile 1 | 604a<br>078541 | → | 606a<br>Social Tile 1 | 608a<br>009752 |
| 602b<br>Map Tile 2 | 604b<br>078542 | → | 606a<br>Social Tile 1 | 608a<br>009752 |
| 602c<br>Map Tile 3 | 604c<br>078543 | → | 606a<br>Social Tile 1 | 608a<br>009752 |
| 602d<br>Map Tile 4 | 604d<br>078544 | → | 606a<br>Social Tile 1 | 608a<br>009752 |
| 602e<br>Map Tile 5 | 604e<br>078545 | → | 606b<br>Social Tile 2 | 608b<br>009753 |
| 602f<br>Map Tile 6 | 604f<br>078546 | → | 606b<br>Social Tile 2 | 608b<br>009753 |

| Event ID | Information Items | → | Map Tile No. | Map Tile ID | → | Social Tile No. | Social Tile ID |
|---|---|---|---|---|---|---|---|
| 702<br>8975823 | 704<br>Name = Kanye Concert<br><br>Date = 21 January 2017<br><br>Location = 37.4, -121.97<br><br>Created-By = Adam Smith<br><br>Attendees = Aaron Smith; Amy Jones… | → | 706<br>Map Tile 4 | 708<br>078544 | → | 710<br>Social Tile 1 | 712<br>009752 |

GEOGRAPHIC PARTITIONING OF EVENT MAPS BASED ON SOCIAL INFORMATION

TECHNICAL FIELD

This disclosure generally relates to databases and file management within network environments, and in particular relates to processing online event listings.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may receive a request for an event recommendation for a user from a client system, such as a smartphone, laptop, desktop, or other suitable client system. The request may be for an event recommendation within the general vicinity of the user. The request may be for an event of a particular category or a listed event, such as a user looking up a concert for a particular artist. In particular embodiments, the social-networking system may access information indicative of a user's geographic location. Information indicative of the user's geographic location may include a Global Positioning System (GPS) signal of the user's phone, a place the user checked-in, a location associated with an IP address, or any other information that may be used to determine a user's geographic location. The social-networking system may access a geographic map that includes a plurality of map tiles, where each map tile defines a geographic area within the map. From the map, the social-networking system may identify a map tile the user is located within based on the geographic location of the user. After determining in which map tile the user is located, the social-networking system may determine a social tile associated with the identified map tile. A social tile may represent a geographic area that users are willing to travel within to attend events. A social tile may include two or more map tiles clustered together based on prior attendee information corresponding to one or more prior events. Attendee information may also refer to users registered to attend an event. In particular embodiments, the social-networking system may retrieve event listings of events that have a geographic location within the social tile. Each of the event listings may include items of event information, such as geographic location, attendee information, and any suitable information to include for event information. The social-networking system may send instructions to present the retrieved event listings as event recommendations to the user's client system.

In particular embodiments, the social-networking system may partition the geographic map into a plurality of social tiles. To do so, the social-networking system may access an event database to compile prior event listings corresponding to prior events, where each of the prior event listing at least includes a geographic location and attendee information of the event. The social-networking system may cluster the map tiles of the geographic map into social tiles based on geographic location and attendee information of the prior events within the map tiles. After clustering the map tiles into social tiles, the social-networking system may assign each of the map tiles to a social tile by mapping a list of map-tile identifiers (IDs) to a social-tile identifier (ID). The list of map tiles mapped to social tiles may be used as a reference to look-up a map tile ID and the assigned social tile ID.

In particular embodiments, a k-means clustering algorithm may be used to cluster the map tiles into social tiles on the geographic map. Initially, a predetermined number of clusters to be generated may be inputted into the k-means clustering algorithm. In particular embodiments, an administrator may set the amount of clusters to be generated for a given geographic map. After setting a predetermined number of clusters, a plurality of vectors indicative of a geographic location of an attendee of a prior event to the geographic location of the respective prior event may be generated and plotted on the geographic map. From there, an initial centroid may be selected for each cluster corresponding to a geographic location on the geographic map. After the initial centroid is selected for each cluster, each of the vectors may be assigned to a centroid based on which centroid is closest to the vector. The social-networking system may calculate a new centroid based on the vectors assigned to the cluster. The geographic location of each cluster may be updated based on the new centroid.

In particular embodiments, the map tiles may be clustered into social tiles based on social signals. Social signals may include the number of co-attendees for two events or the number of users registered to attend both events. An event graph may be generated that overlays the geographic map, where the event graph may include a plurality of vertices indicative of the geographic locations of prior events and a plurality of edges connecting the vertices, which may represent the social signals between the vertices. An edge weight may be determined for each edge, which indicates the value of the edge, such as the number of co-attendees for two events. The social-networking system may then calculate an edge value for a geographic area based on the number of edges and the edge weights of those edges. The social-networking system may use the calculated edge values to identify geographic areas that have an edge value below a threshold edge value. The social-networking system may determine a plurality of partitions from the identified geographic areas that have an edge value below a threshold edge value.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates a list format of a social-tile database that includes a list of map tiles and an assignment of each map tile to a social tile.

FIG. 7 illustrates a list format of an event database that includes information items of each event listing and the assignment of each event listing to a map tile and to a corresponding social tile.

DESCRIPTION OF EXAMPLE EMBODIMENTS

System Overview

Figure 1:
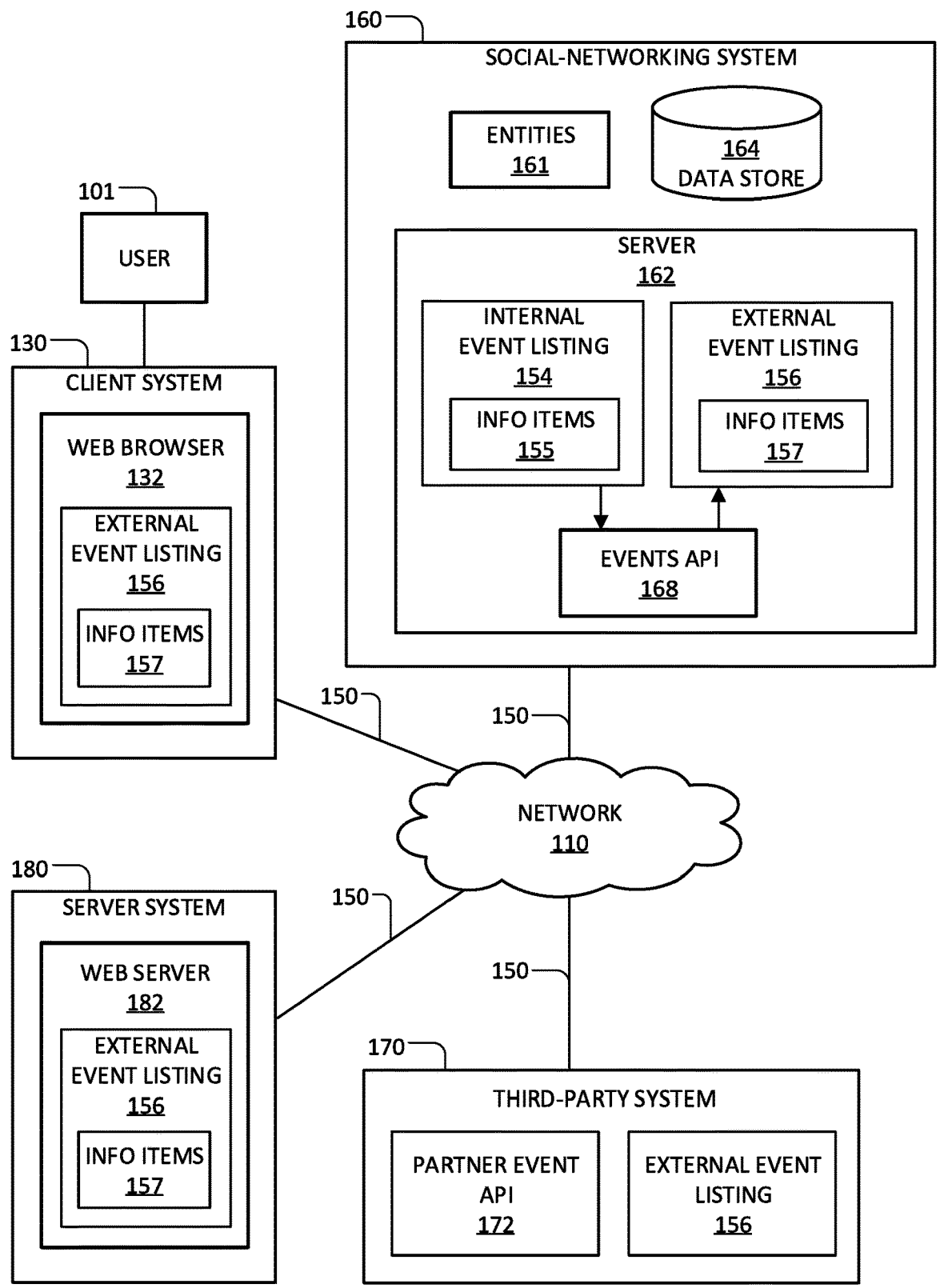
FIG. 1 illustrates an example network environment associated with an event system on an online social network.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Aggregating Events

In particular embodiments, a social-networking system 160 may receive external event listings 156 from external sources, such as third-party system 170, web browser 132 located on a client system 130, web server 182 located on a server system 180, or other suitable data sources. Each of the external event listings 156 may describe a corresponding real-world event, and may include one or more information items 157, such as an event name, date, location, or the like. In particular embodiments, the social-networking system 160 may create, retrieve, update, and delete internal event listings 154. The information in the internal event listings 154 may be based on the external event listings 156. The social-networking system 160 may receive the external event listings 156 and map at least a portion of the information in the external event listings 156 to one or more of the internal event listings 154. Each internal event listing 154 may correspond to one or more external event listings 156 and may include one or more information items 155, which may be from the corresponding external event listing 156. As an example, an internal event listing 154 may be a copy of or reference to a corresponding external event listing 156 received from an external data source. One or more of the internal information items 155 in each internal event listing 154 may be copies of or references to, or otherwise based on, information items 157 of the corresponding external event listing 156. The internal event listings 154 may be stored in one or more data stores 164 of the social-networking system 160 or other appropriate storage media. Thus, external information items 157 of the external event listings 156 may be received via the network 150 and stored in the data store 164 as internal event listings 154.

In particular embodiments, the third-party systems 170, server system 180, and/or client system 130 may be provided by third parties such as partners, which may be ticket sales organizations, performance venues, event aggregators, or the like. As an example, the third-party systems 170 may access the events hosted by the social-networking system 160 via an API, which may involve a web service invocation via the network 110. The API may be publicly-accessible or accessible by partners of the third party. The partner may be suitable third-party partners. The partner may host the third-party system 170 and cause internal event listings 154 to be created via a public API by, for example, sending messages containing external event listings 156 to a server 162 associated with the social-networking system 160. The third-party system 170 may maintain external event listings 156 and provide a partner event Application Programming Interface (API) or other suitable communication interface via which the social-networking system 160 may request the external event listings 156. The social-networking system 160 may send the requests to the third-party system 170 via the network 150, and the third-party system 170 may send the requested external event listings 156 back to the social-networking system 160 as responses via the network 110. As another example and not by way of limitation, the social-networking system 160 may invoke an event aggregator's API to retrieve the aggregator's and/or partner's event inventory. The event aggregator's API may provide operations for requesting external event listings 156 similar to those of the partner event API.

In particular embodiments, the social-networking system 160 may receive, from an external event system, one or more external event listings 156 corresponding to one or more events, respectively, wherein each external event listing 156 includes one or more items of event information 157 associated with the respective event. The one or more events may be, for example, real-world events that are scheduled to be held at a particular time and place. The external event system may be, for example, the client system 130 that hosts the web browser 132, the server system 180 that hosts the web server 182, or the third-party system 170 that may host the partner event API 172.

In particular embodiments, the social-networking system 160 may receive external event listings 156 from a user 101 of the social-networking system 160 via a web browser 132 hosted by a client system 130. As an example and not by way of limitation, the user 101 may enter information items 157, such as an event name, date, and location in the web browser 132 or other application executing on the client system 130. An external event listing 156 may be created on the client system 130 from the information items 157 and sent to the events API 168 of the social-networking system 160 via the network 150.

In particular embodiments, the social-networking system 160 may receive external event listings 156 from a web server 182 in the form of web content, e.g., HTML documents, which may be received via the network 150. The external event listings 156 may be in any suitable data format. Each external event listing 156 may include one or more external information items 157. The social-networking system 160 may parse the received external event listings 156 to extract external event information items 157 to be included in internal event listings 154. In particular embodiments, the social-networking system 160 may crawl web servers 182 or perform a web search to identify external event listings 156 that include external information items 157 located on one or more web servers 182 and representing or suitable for use in external event listings 156. The social-networking system 160 may convert such identified external information to a defined data format or structure to form external event listings 156. Alternatively or in addition, the social-networking system may retrieve the external event listings 156, including information items 157 in the format in which the external event listings 156 are stored on their host system. The host system may be, e.g., the third-party system 170, the server system 180, the client system 130, or other system that hosts external events 156. The social-networking system 160 may generate internal event listings 154 based on the external event listings 156, e.g., by copying or parsing the information items 157 of the external event listings 156 from a defined data format or structure and storing the copied or parsed information items 157 in internal event listings 154 in the data store 164.

In particular embodiments, the network address of the web server 182 (e.g., a URL) from which to retrieve external event listings 156 may be identified using a search engine or by an existing association between the web server 182 and existing event listings. As an example and not by way of limitation, existing internal event listings 154 may include information items 155, such as an artist name, genre, location, date, that can be used to identify particular web sites that may provide information about additional events. In this example, one or more web servers 182 that host content referencing or related to the name of the artist, genre, location, or date of an existing event may be searched for event information. As another example, text in the internal information items 155 in the existing event listings 154 may be used to form search queries in web searches to identify web servers 182 from which additional event information may be retrieved. The social-networking system 160 may retrieve the event information from such web servers 182 and create internal event listings 154 based on the retrieved information. As an example and not by way of limitation, the external event listings 156 may be retrieved from the web server 182 via an appropriate API. As another example and not by way of limitation, such event information may be in HTML or other suitable data format and may be retrieved from the web server 182 using HTTP or other suitable protocol.

More information on aggregating events may be found in U.S. patent application Ser. No. 15/847,799, filed 19 Dec. 2017, which is incorporated by reference.

Social Graphs

Figure 2:
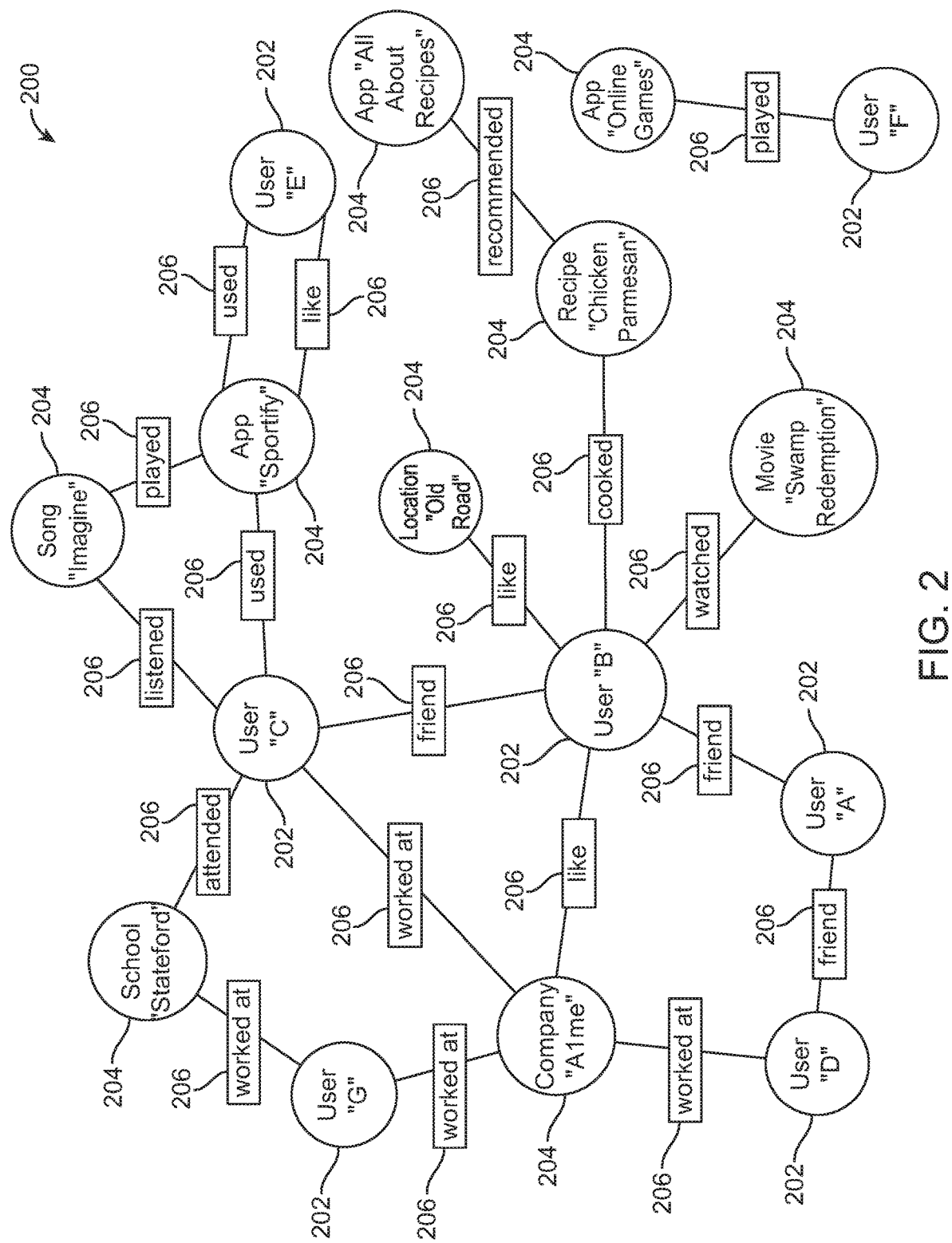
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206. The degree of separation between two objects represented by two nodes, respectively, is a count of edges in a shortest path connecting the two nodes in the social graph 200. As an example and not by way of limitation, in the social graph 200, the user node 202 of user "C" is connected to the user node 202 of user "A" via multiple paths including, for example, a first path directly passing through the user node 202 of user "B," a second path passing through the concept node 204 of company "Acme" and the user node 202 of user "D," and a third path passing through the user nodes 202 and concept nodes 204 representing school "Stanford," user "G," company "Acme," and user "D." User "C" and user "A" have a degree of separation of two because the shortest path connecting their corresponding nodes (i.e., the first path) includes two edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204).

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Event Listings

Figures 3A, 3B:
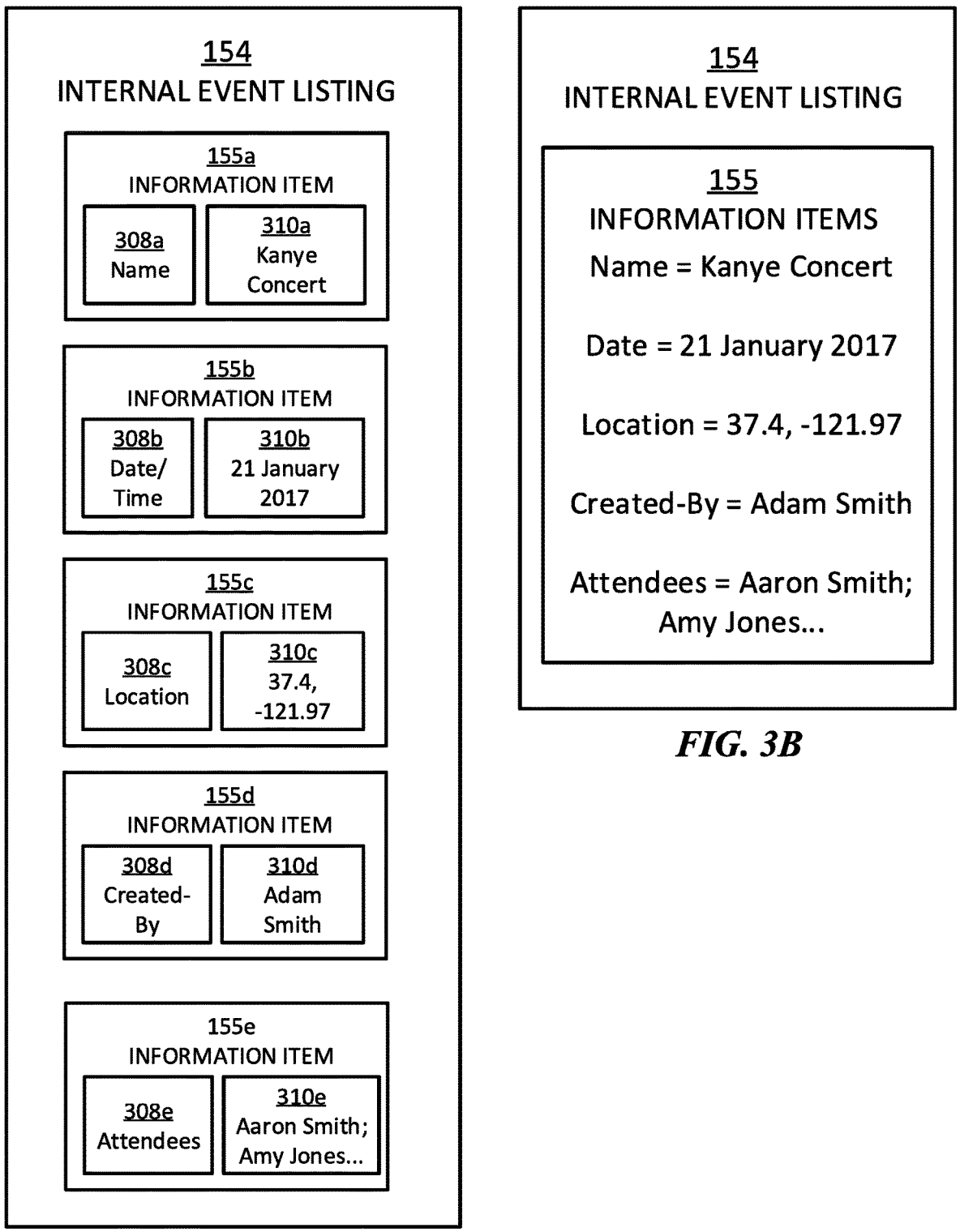
FIGS. 3A and 3B illustrate an example internal event listing associated with a user entity of a social-networking system.

FIGS. 3A and 3B illustrate an example internal event listing 154 associated with a user entity of a social-networking system 160. Although FIGS. 3A and 3B show internal event listings 154, external event listings 156 may be represented similarly. FIG. 3A illustrates the name 308 and value 310 components of the information items 155 of the internal event listing 154. An information item 155 may be represented as a data value. For example, the value "Kanye West" may be an information item 155 in an event listing for a music event. As shown in FIG. 3A, an information item 155 may have an associated name 308. FIG. 3B shows the information items 155 as name-value pairs in the format "name=value." FIGS. 3A and 3B show different representations of five information items 155a-155e: an event name item 155a (Name="Kanye Concert"), an event date/time item 155b (Date="21 Jan. 2017"), an event location item 155c, (Location="37.4, −121.97"), an item 155d identifying the user who created or is responsible for the event listing 154 (Created-By="Adam Smith"), and an item 155e identifying the attendees of the event. In particular embodiments, item 155e may identify the registered users of the event. The term "time" as used herein may refer to a time of day, e.g., 5:00 PM, or to a date, e.g., 21 Jan. 2017, or to a data and time, e.g., 21 Jan. 2017 at 5:00 PM, or "today" at 5:00 PM, or "every day" at 5:00 PM, and so on. A point in time may include or be associated with a date, such as 21 Jan. 2017. FIG. 3A shows a first information item 155a having a name-value pair with name="Name" 308a and value="Kanye Concert" 310a, a second information item 155b having name="Date" 308b and value="21 Jan. 2017" 310b, a third information item 155c having name="Location" 308c and value="37.4, −121.97" 310c, a fourth information item 155d having name="Created-By" 308d and value="Adam Smith" 310d, and a fifth information item 155e having name="Attendees" 308e and value="Aaron Smith; Amy Jones . . . " 310e.

In particular embodiments, an event listing 154 may include at most one information item 155a having a particular name 308a, so storing a different value 310a in an event listing 154 for an information item 155a using the same name 308a may have the effect of replacing the existing value 310a. For example, storing the information item 155b Date/Time="14 Feb. 2017" in an event listing 154 that has an existing information item 155b Date/Time="21 Jan. 2017" may change the value 310b of the existing Date/Time item 155b to "14 Feb. 2017." Alternatively, an event listing 154 may include multiple information items 155a having the same name 308a, or multiple values 310a for an information item 155a having the same name 308a. For example, if multiple information items 155 having the same name are permitted, an internal event listing 154 for an event having two dates may include the information items 155b Date/Time="21 Jan. 2017" and Date/Time="14 Feb. 2017."

In particular embodiments, the social-networking system 160 may identify, for each of the external event listings 156 received from the external event system, one or more entities 161 of the online social network 160 associated with the external event listing 156. The entities 161 may be online representations of people, businesses, groups, and so on. In particular embodiments, each entity 161 may include a page identifier (ID) that is tagged for the internal event listing 154 or external event listing 156. In particular embodiments, entities 161 may be identified by data in the external event listings 156, such as strings, photos, locations, or other type of data identifying entities.

In particular embodiments, to identify the entities 161, the social-networking system 160 may parse the items of event information 157 of the external event listing 156 to identify one or more name strings and identify the entities 161 of the online social network 160 that correspond to the name strings. The name strings may be, e.g., names of people, businesses, groups, and so on. Although external event listings 156 are used in examples described herein, entities associated with internal event listings 154 may also be identified. The identified entity may thus provide a link between the event listings 154, 156 and the social-networking system 160.

In particular embodiments, the social-networking system 160 may receive, from a client system 130, content posted to the online social network by a first user 101 of the online social network. The content may reference one of the internal event listings 154. The social-networking system 160 may then send, to one or more client systems 130, one or more notifications based on the referenced internal event listing 154 to one or more second users 101. As an example and not by way of limitation, the second users 101 may be users 101 who are listed as attendees of the event associated with the referenced internal event listing 154. The attendees list may be associated with the internal event listing 154 in the data store 164 or may be represented as user nodes linked to an event node that corresponds to the referenced internal event listing 154 by graph edges, e.g., edges that represent an "attendee" relationship. As another example, the second users may be friends of the first user on the online social network. As still another example, the notifications to the second users may include recommendations for the event associated with the referenced internal event listing. The recommendations may include text recommending that the second user attend the event and a link to or a copy of one or more of the information items 155 associated with the corresponding internal event listing 154.

In particular embodiments, the social-networking system 160 may receive, from the client systems 130, user-submitted corrections to the one of the internal event listings 154. Each user-submitted correction may include an updated item of event information 155. The social-networking system 160 may then update the event listings 154 to include a particular updated item of event information 155 when at least a threshold number of corrections comprising the particular updated item of event information 155 are received. As an example and not by way of limitation, if more than the threshold number of instances of the same correction to an item of event information 155 are received, and each correction is received from a different user, then the corrections may be applied to the item of event information 155. The threshold number may be, e.g., 2, 3, 5, or other appropriate number. An example correction may be changing the location of an event to a new location, e.g., from London to San Francisco. If this particular correction is received for a particular internal event listing 154, then the correction may be applied to the event listing by setting the value of the listing's location information item to "San Francisco."

In particular embodiments, the one or more external event listings may be received from an external event system 170, such as the third-party system 170, the server system 180, or the client system 130, via an events application programming interface (API) 168. As an example and not by way of limitation, the API 168 may include a set of instructions defined at the online social network 160, the set of instructions being executable to enable the external event system to share the external event listings 156 on the online social network 160. In particular embodiments, the API may be a partner API 172 that includes a set of instructions defined at the external event system, the set of instructions being executable to enable the online social network 160 to retrieve external event listings 156 from the external event system. In particular embodiments, the social-networking system 160 may send, to an external event system, a request for the external event listings 156 via the partner event API 172, and the external event listings 156 may be received from the external event system in response to sending the request.

In particular embodiments, the social-networking system 160 may crawl event pages hosted by a web server 182 of the external event system (e.g., the web server 182 on the server system 180) to identify the external event listings 156. As an example and not by way of limitation, crawling the event pages may include searching the content of the event pages hosted by the web server 182, as done by a web search engine. The event pages may be, e.g., web pages that include information related to events, such information items 157. The external event listings 156 may be received by the social-networking system 160 from the external event system in response to crawling the event pages.

In particular embodiments, the social-networking system 160 may determine, for each of the external event listings, whether the external event listing corresponds to an internal event listing on the online social network based on an analysis of the event information associated with the respective external event listing. As an example and not by way of limitation, the social-networking system 160 may compare the information items 157 in the received external event listing 156 to the information items 155 in each internal event listing 154 to determine whether one of the internal event listings 154 is likely to correspond to the same real-world event as the external event listing 156. This determination may be made based on similarities between the information items 155, 157 in the two event listings 154, 156 being compared, e.g., by computing probabilities that the event listings 154, 156 represent the same real-world event, and selecting the internal event listing 154, 156 that has the highest probability and/or satisfies a threshold condition, e.g., that the probability is greater than a threshold value such as 90%, 95%, 99%, or other appropriate value.

In particular embodiments, if the social-networking system 160 identifies a "matching" internal event listing 154 that likely represents the same real-world event as the external event listing 156, e.g., is likely a duplicate event listing, then differences between the internal and external event listings, if any, may be resolved. The operations performed to resolve duplicates may depend on the type of source that created the existing internal event listing 154. In particular embodiments, if the existing internal event listing 154 is created by the same source as the new external event listing 156, then the existing internal event listing 154 may be updated. In particular embodiments, if the existing internal event listing 154 is created by a partner, other third-party partners, e.g., through a partner event API, then performer (e.g., artist) information from the new external event listing 156 may be appended to the existing internal event listing 154 as follows. Information items 157 from the external event listing 156 that are not present in the matching internal event listing 154 may be added to the internal event listing 154. Alternatively, a new internal event listing 154 may be created, and may include information items 155 copied from information items 157 of the external event listing 156. The new internal event listing 154 may also include redirection information that identifies the new internal event listing 154 as being in an event cluster with the existing internal event listing 154. The redirection information may also identify a canonical event listing in the event cluster to which the other event listings in the cluster are redirected. In particular embodiments, if the existing internal event listing is created by a user 101, then duplication may not be performed, e.g., the existing internal event listing 154 may not be updated.

In particular embodiments, the social-networking system 160 may, for each of the external event listings 156, if the external event listing 156 corresponds to an internal event listing 154, update the internal event listing 154 to include one or more items of event information 155 based on (e.g., copied from) corresponding items of event information 157 associated with the external event listing 156. The internal event listing 154 may be associated with one or more entities of the social-networking system 160. As an example and not by way of limitation, when the social-networking system 160 receives an external event listing 156 that corresponds to an existing internal event listing 154 with greater than a threshold probability, the existing internal event listing 154 may be updated to include additional information items 155 from the received external event listing 156 that are not present in the existing internal event listing 154. The additional information items 155 may be associated with or stored in the internal event listing 154. For example, one or more of the information items 155 shown in FIG. 3A may have been added to the internal event listing 154 as additional information items subsequent to its creation. In particular embodiments, additional information items 155 may be added to or otherwise associated with the internal event listing 154 as hidden information items. Hidden information items may be hidden from (e.g., not visible to) users who do not satisfy certain criteria. For example, hidden information items may ordinarily not be displayed or otherwise presented to users who are not the creator of the hidden information items. As another example, hidden information items may be visible to users who are first-degree friends of the user who created them.

In particular embodiments, internal event listings 154 having hidden information items may be identified by event searches that match the hidden information items, but the hidden information items are not presented to users. That is, event listings 154 having hidden information items matching a search query may be presented as search results, though the hidden information items are not displayed with the search results and are not otherwise accessible to the user who performed the search. In other embodiments, the hidden information items may be presented to particular users, e.g., to a user who submitted the information that became the hidden information items. In still other embodiments, the hidden information items may be shown to users if a condition is satisfied, e.g., if a user specifically requests that hidden information be displayed. The hidden information items may be shown with an indication that the items are potentially unreliable or not applicable to the user viewing them. In particular embodiments, a user who submits information that becomes one or more hidden information items may specify associated permissions, e.g., that the hidden information items are not to be presented to other users or are only to be presented to the submitting user's friends, for example.

In particular embodiments, a user 101 may request that an internal event listing 154 be created or updated. The user 101 may also specify one or more information items 155 to be included in the internal event listing 154. As an example and not by way of limitation, a user interface provided by a web browser 132 and/or web server 182 may provide a command, e.g., a button or the like, to create an internal event listing 154 using one or more user-specified information items 155. The user interface may receive one or more information items 155 and, optionally, additional information identifying an existing internal event listing 154, such as a name or unique identifier for the existing internal event listing 154. The user interface may send the information items 155 and optional identifying information to the social-networking system 160, e.g., by invoking operations of the events API 168 over the network 110. If an internal event listing 154 corresponding to the specified information items 155 already exists in the social-networking system 160 (e.g., is present in the data store 164), then the user interface may request the social-networking system 160 to update the existing internal event listing 154 to include the user-specified information items 155 and notify the user when the existing event listing 154 has been updated. The user-specified information items 155 may be added to the existing event listing as searchable-only items, as publicly-visible items, or as items having other suitable access restrictions. The user interface may notify the user about the access restrictions associated with the information items 155, if any. The particular access restrictions may be specified by a system administrator or by the user, for example.

In particular embodiments, if a received external event listing 156 does not correspond to an internal event listing 154, then the social-networking system 160 may create a new internal event listing 154 based on the one or more items of event information 157 associated with the external event listing 156. The new internal event listing 154 may be associated with the one or more identified entities associated with the external event listing 156. The user interface may notify the user 101 that the new internal event listing 154 has been created. For example, a user 101 may request that an internal event listing 154 be created with the following two information items: Name="Kanye Concert" and Date/Time="21 Jan. 2017." The user's request may include at least one "existing" information item 155 having the same value as an information item 155 in existing event listing 154, such as the event name "Kanye Concert." The user's request may also include at least one "new" information item 155 having a value that is not included in the existing event listing 154, such as an attendee list "Aaron Smith; Amy Jones . . ." As another example, the user may specify an "update" information item 155 having a different value for an existing information item 155 in the existing event listing 154. For example, the date stored in the internal event listing 154 for the "Kanye Concert" event may be changed from 21 Jan. 2017 to 28 Jan. 2017 by a user command, such as an operation performed by the user in a user interface setting the date of the event to 28 Jan. 2017.

Geographic Partitioning of a Geographic Map into Social Tiles

In particular embodiments, the social-networking system 160 may receive a request for an event recommendation for a user 101 from a client system 130, such as a smartphone, laptop, desktop, or other suitable computing device. The request may be for an event recommendation within the general vicinity of the user 101. The request may be for an event of a particular category or a listed event, such as a user 101 looking up a concert for a particular artist. In particular embodiments, the social-networking system 160 may access information indicative of a user's 101 geographic location. Information indicative of the user's 101 geographic location may include a Global Positioning System (GPS) signal of the user's 101 phone, a place the user 101 checked-in, a location associated with an IP address, or any other information that may be used to determine a user's 101 geographic location. The social-networking system 160 may access a geographic map that includes a plurality of map tiles, where each map tile defines a geographic area within the map. From the map, the social-networking system 160 may identify a map tile the user is located within based on the geographic location of the user 101. After determining in which map tile the user 101 is located, the social-networking system 160 may determine a social tile associated with the identified map tile. A social tile may represent a geographic area that users 101 are willing to travel within to attend events. A social tile may include two or more map tiles clustered together based on prior attendee information corresponding to one or more prior events. Attendee information may also refer to users 101 registered to attend an event. In particular embodiments, the social-networking system 160 may retrieve event listings of events that have a geographic location within the social tile. Each of the event listings may include items of event information, such as geographic location, attendee information, and any suitable information to include for event information. The social-networking system 160 may send instructions to present the retrieved event listings as event recommendations to the user's 101 client system 130.

In particular embodiments, the social-networking system 160 may partition the geographic map into a plurality of social tiles. To do so, the social-networking system 160 may access an event database to compile prior event listings corresponding to prior events, where each of the prior event listing at least includes a geographic location and attendee information of the event. The social-networking system 160 may cluster the map tiles of the geographic map into social tiles based on geographic location and attendee information of the prior events within the map tiles. After clustering the map tiles into social tiles, the social-networking system 160 may assign each of the map tiles to a social tile by mapping a list of map-tile identifiers (IDs) to a social-tile identifier (ID). The list of map tiles mapped to social tiles may be used as a reference to look-up a map tile ID and the assigned social tile ID.

In particular embodiments, a k-means clustering algorithm may be used to cluster the map tiles into social tiles on the geographic map. Initially, a predetermined number of clusters to be generated may be inputted into the k-means clustering algorithm. In particular embodiments, an administrator may set the amount of clusters to be generated for a given geographic map. After setting a predetermined number of clusters, a plurality of vectors indicative of a geographic location of an attendee of a prior event to the geographic location of the respective prior event may be generated and plotted on the geographic map. From there, an initial centroid may be selected for each cluster corresponding to a geographic location on the geographic map. After the initial centroid is selected for each cluster, each of the vectors may be assigned to a centroid based on which centroid is closest to the vector. The social-networking system 160 may calculate a new centroid based on the vectors assigned to the cluster. The geographic location of each cluster may be updated based on the new centroid.

In particular embodiments, the map tiles may be clustered into social tiles based on social signals. Social signals may include the number of co-attendees for two events or the number of users 101 registered to attend both events. An event graph may be generated that overlays the geographic map, where the event graph may include a plurality of vertices indicative of the geographic locations of prior events and a plurality of edges connecting the vertices, which may represent the social signals between the vertices. An edge weight may be determined for each edge, which indicates the value of the edge, such as the number of co-attendees for two events. The social-networking system 160 may then calculate an edge value for a geographic area based on the number of edges and the edge weights of those edges. The social-networking system 160 may use the calculated edge values to identify geographic areas that have an edge value below a threshold edge value. The social-networking system 160 may determine a plurality of partitions from the identified geographic areas that have an edge value below a threshold edge value.

In particular embodiments, the social-networking system 160 may send event recommendations to a particular user within a geographic area that users 101 generally are likely to register for events. Event recommendations may be improved by clustering map tiles based on historical event information, such that users 101 will receive recommendations for events occurring not just in their own map tile, but also other map tiles in their larger "social tile." A social tile may define a cluster of map tiles where people in a given area will travel for events. The social tiles may be determined within a geographic map by using items of event information (e.g., metadata of events) associated with events that occurred within the geographic map, where the items of event information may be mined offline from an events database. As an example and not by way of limitation, a geographic map may be an area of California encompassing Modesto, Napa, Sacramento and San Francisco. In particular embodiments, the geographic map may be defined as any map including an area below a predetermined threshold. The items of event information for each event may include the location of the event, the author of the event, the number of people who attended the event, and the locations of the attendees. Other items of event information may also be included, such as the user ID of the attendees to determine one or more events a particular user 101 has attended. Although this disclosure may reference particular users 101 as "attendees," this may also refer to users 101 who have registered to attend an event. For example, items of event information related to attendees may refer to items of event information of users 101 who have registered for the respective event. These items of event information may be compiled into an event database, which may be analyzed using a clustering algorithm to identify the map tiles within each social tile. The clustering algorithm may use k-means clustering or graphic partitioning using social signals to generate the social tiles. Prior systems would recommend events based primarily on geographic distance (e.g., recommending events within N miles, or events within a specific map tile/adjacent tiles). Using social tiles may improve event recommendations by recommending events in geographic locations that prior systems would fail to identify (e.g., events in the social tile but beyond the N mile threshold, or outside the user's current map tile), while excluding events in geographic locations that prior systems would erroneously recommend (e.g., events that are geographically closer but fall outside the social tile for various reasons, such as being a difficult or undesirable location). As an example and not by way of limitation, a user 101 in one location (e.g., Sacramento) may be closer to another location (e.g., Stockton, which is 48 miles away), but more likely to attend events in a third location (e.g., San Francisco, which is 87 miles away). This may be for a variety of reasons such as, there may be more desirable events that occur in the third location (e.g., San Francisco has better/larger venues), the user 101 may know more people in the area, etc. To improve upon identifying relevant events that a user 101 may want to attend, the items of event information may be processed to identify trends of users going to events in certain areas (e.g., users in Sacramento going to events in San Francisco), and then generate clusters of events by clustering map tiles into larger social tiles. These "social tile" clusters/partitions can define a geographic area where users 101 within the clusters will travel to attend events. While the disclosure focuses on event recommendations, these techniques may be useful for any type of location-based recommendation. Furthermore, although this disclosure describes geographic partitioning of a geographic map in a particular manner, this disclosure contemplates geographic partitioning in any suitable manner.

In particular embodiments, the social-networking system 160 may receive a request for event recommendations from a user 101. A user 101 may use his or her client system 130 to send a request for event recommendations which is received by the social-networking system 160. As an example and not by way of limitation, a user 101 may use his or her smartphone to look up events to attend nearby on a social-networking application, which sends a request to be received and processed by the online social network. In particular embodiments, the social-networking system 160 may receive a request for social event recommendations, which correspond to event listings that one or more of the user's 101 friends have registered to attend. As an example and not by way of limitation, the social-networking system 160 may send event listings that a user's 101 friends have already registered to attend so a user 101 is more inclined to join an event since the user 101 would know people at the event. Although this disclosure describes receiving requests for event recommendations in a particular manner, this disclosure contemplates receiving requests for event recommendations in any suitable manner.

In particular embodiments, the social-networking system 160 may access information indicative of a geographic location associated with the user 101. The social-networking system 160 may determine the physical location of the user 101 with respect to a geographic map. As an example and not by way of limitation, the social-networking system 160 may use a Global Positioning System (GPS) signal of a user's 101 phone to determine the user's 101 location. As another example and not by way of limitation, the social-networking system 160 may determine a user's 101 location based on identifying a place a user 101 has recently checked-in, such as checking into a particular café 's profile interface of the online social network, where the social-networking system 160 has the location of the particular café stored. As another example and not by way of limitation, the social-networking system 160 may determine the user's 101 location from the user's 101 IP address. Although this disclosure describes accessing information indicating a geographic location associated with the user 101 in a particular manner, this disclosure contemplates retrieving the geographic location of the user 101 in any suitable manner.

More information on determining a user's location may be found in U.S. patent application Ser. No. 14/935,263, filed 21 Mar. 2017, which is incorporated by reference.

In particular embodiments, the social-networking system 160 may access a geographic map comprising a plurality of map tiles, where each map tile defines a geographic area within the map. The social-networking system 160 may access a geographic map that may be a sub-area of the globe and a map-tile database that overlays a plurality of map tiles onto the geographic map. Although this disclosure describes accessing a geographic map in a particular manner, this disclosure contemplates accessing a geographic map in any suitable manner.

In particular embodiments, the social-networking system 160 may identify a map tile of the plurality of map tiles associated with the user 101 based on the geographic location associated with the user 101. The social-networking system 160 uses the geographic location of the user 101 to identify which map tile the user 101 is located within. As an example and not by way of limitation, the social-networking system 160 may use a map-tile database which includes GPS coordinates that fall within each map tile, such as a range of GPS coordinates, and identify the user's 101 GPS coordinates and determine which map tile the user 101 is located within. Although this disclosure describes identifying a map tile associated with a user 101 in a particular manner, this disclosure contemplates identifying a map tile associated with a user 101 in any suitable manner.

In particular embodiments, the social-networking system 160 may determine a social tile associated with a map tile. The social-networking system 160 may perform an offline process of generating social tiles which are map tiles clustered together based on prior attendee information corresponding to one or more prior events as described below with respect to FIGS. 4 and 5. In particular embodiments, the social-networking system 160 may access a social-tile database that includes a list of map tiles and a social-tile identifier (ID) for each map tile indicating an assignment of each map tile to a social tile and identify the social tile by looking up the map tile in the list of map tiles to find the social-tile ID. Although this disclosure contemplates determining a social tile associated with a map tile in a particular manner, this disclosure contemplates determining a social tile associated with a map tile in any suitable manner.

In particular embodiments, the social-networking system 160 may retrieve one or more event listings corresponding to one or more events having a geographic location within the social tile. The social-networking system 160 may access a database to retrieve event listings located in the same social tile as described below. Each of the event listings may include event information as described above. In particular embodiments, the event listings may include page identifiers (ID) and categories to further determine which events to retrieve. As an example and not by way of limitation, a reoccurring event may have a particular page ID and social-networking system 160 may store information that a user 101 has attended an event with a particular page ID before and may want to attend the same event in the future. As another example and not by way of limitation, an event listing may include a category and social-networking system 160 may determine a trend for a particular user 101 that he or she likes to attend a specific type of event (e.g., trivia nights at pubs, coding events, etc.). Although this disclosure describes retrieving one or more event listings in a particular manner, this disclosure contemplates retrieving event listings in any suitable manner.

In particular embodiments, the social-networking system 160 may send instructions for presenting event recommendations corresponding to one or more retrieved event listing. The social-networking system 160 may send the instructions to a client system 130 of the user 101 to display for the user 101 to see the event recommendations. As an example and not by way of limitation, the social networking system 160 may send an event listing corresponding to a concert in the user's 101 vicinity to attend. Although this disclosure describes sending instructions to present event recommendations in a particular manner, this disclosure contemplates sending instructions to present event recommendations in any suitable manner.

Figure 4A:
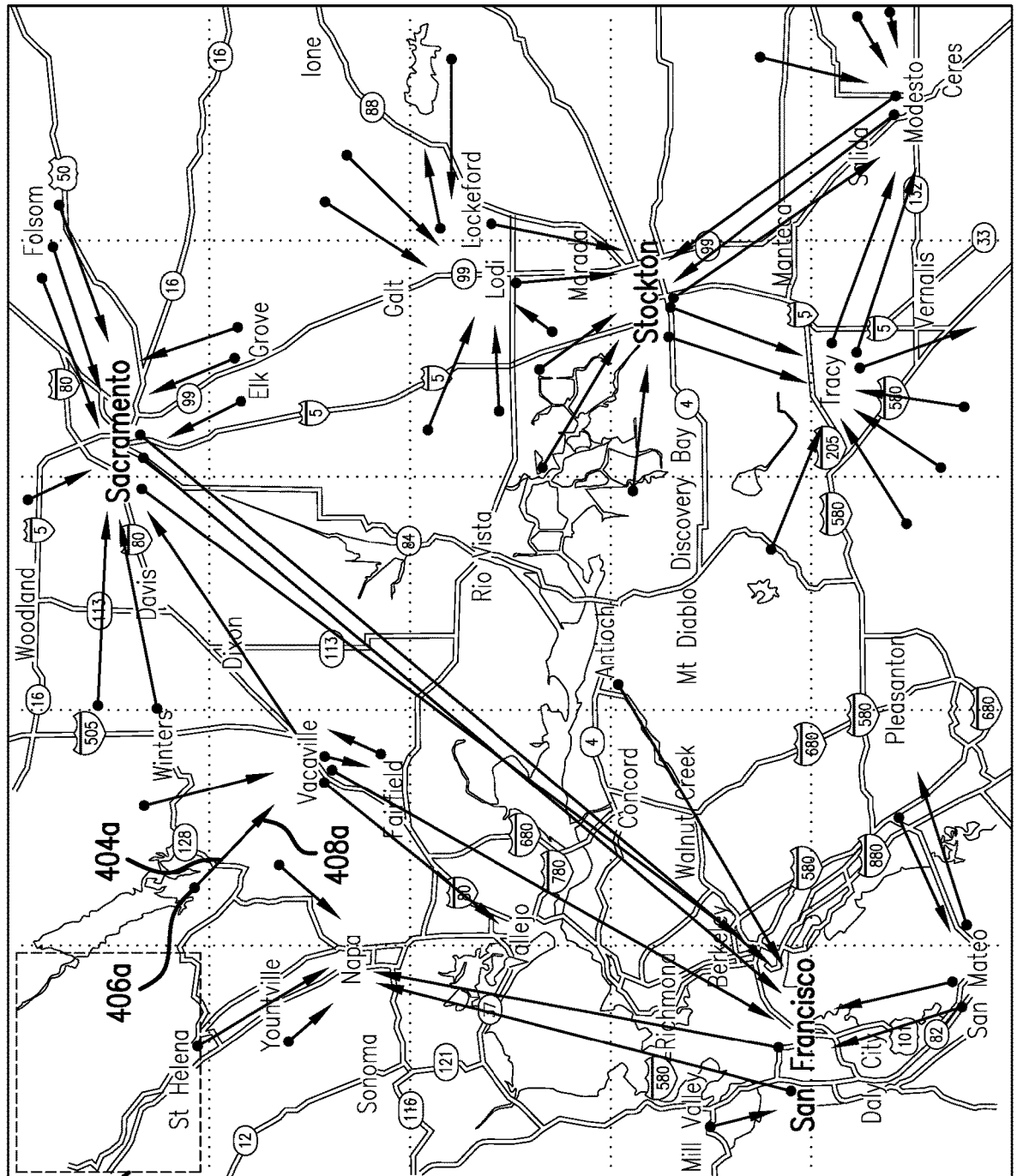
FIGS. 4A-4D illustrate an example of partitioning a geographic map using k-means clustering on vectors.

FIG. 4A illustrates an example of partitioning a geographic map 400 into a plurality of social tiles and clustering a plurality of map tiles 402 into one of the plurality of social tiles. In particular embodiments, any one of the client system 130, social-networking system 160, third-party system, or server system 180 may perform a geographic partitioning of the geographic map 400. In particular embodiments, the geographic map 400 is determined based on geographic boundaries that define sub-areas around the globe. As an example and not by way of limitation, a mountain range may be the border of a sub-area and the ocean may be another border of the sub-area. In particular embodiments, the size of the sub-areas may be restricted to a predetermined threshold area. As an example and not by way of limitation, after defining an area enclosed by geographic boundaries, the sub-area may be divided into further sub-areas of about 500 square miles or another predetermined threshold area. In particular embodiments, the geographic map 400 may include a sub-area of the whole globe of which is partitioned into a plurality of sub-areas that are approximately the same area corresponding to a predetermined threshold area. As an example and not by way of limitation, geographic map 400 may include a plurality of map tiles 402, such as map tile 402a, which represents a geographic area north of St. Helena. The geographic map 400 may include a plurality of vectors 404 that are plotted on the geographic map 400. Each of these vectors 404 may include an initial location 406 of an attendee of an event and an event location 408, in which the vector is plotted from the initial location 406 to the event location 408. As an example and not by way of limitation, a vector 404a may have an initial location 406a (e.g., location outside of Winters) located in one map tile representative of a location of an attendee of an event (e.g., Trivia Night) and an event location 408a (e.g., location of Trivia Night within Vacaville) located in another map tile. Each of the vectors 404 may represent the shortest distance between an event and one of its attendees. In particular embodiments, the initial location 406 may represent a location of a user registered to attend an event. As an example and not by way of limitation, the initial location 406 may represent a user's home location and where the user started from to travel to an event. This may be used to determine how far users are willing to travel to these past events and may be willing to travel for future events. As shown in FIG. 4A, a plurality of vectors 404 may be plotted on a geographic map 400 encompassing an area of California including Napa, Modesto, Sacramento, and San Francisco. In particular embodiments, an event database may be accessed to identify all of the events that occurred within a given geographic area. As an example and not by way of limitation, all of the events that occurred within the geographic map 400 may be determined from an event database and vectors 404 may be plotted within the geographic map 400 based on event information of event listings corresponding to the events within the geographic map 400.

Figure 4B:
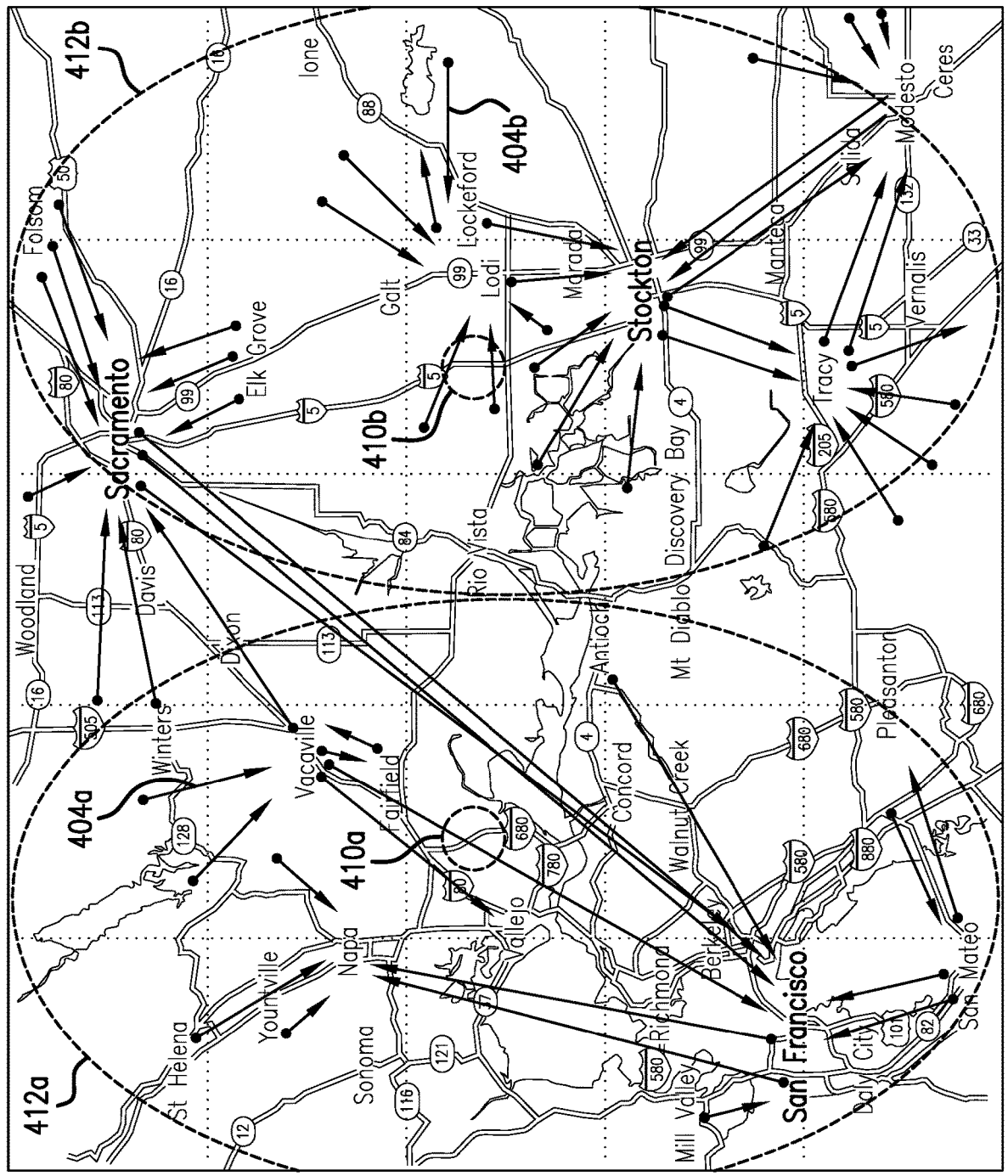

FIG. 4B illustrates an initialization step of partitioning the geographic map 400. In particular embodiments, an administrator and/or user 101 may specify how many partitions are required for the geographic map 400. Alternatively, the number of partitions may be identified based on machine learning algorithms to determine an optimal number of partitions for a given geographic area based on the size of the geographic area, population density, geographic boundaries, etc. In particular embodiments, a k-means clustering algorithm may be performed on the plurality of vectors 404. After the number of partitions to be made is established, one or more centroids 410 may be generated to represent a centroid 410 of a cluster 412. One or more of the plurality of vectors 404 may be assigned to a cluster 412 based on the closest centroid 410 to a particular vector 404. As an example and not by way of limitation, given the number of partitions is set to 2 and given vector 404a is closer to centroid 410a than centroid 410b, then vector 404a may be assigned to a cluster 412a associated with centroid 410a. Furthermore, continuing the example, vector 404b may be assigned to a cluster 412b associated with centroid 410b. Each of the vectors 404 plotted on the geographic map 400 may be assigned to a cluster 412a-412b. After each of the vectors 404 are assigned to a cluster 412a-412b, then new centroids 410a-410b are calculated based on the vectors 404 assigned to each cluster 412a-412b. In particular embodiments, vectors 404 may initially be randomly assigned to a cluster 412 prior to determining a centroid 410 and a centroid 410 may be calculated once the vectors 404 have been randomly assigned to each cluster 412.

More information on vector clustering and nearest neighbor search may be found in U.S. patent application Ser. No. 15/393,926, filed on Dec. 29, 2016, which is incorporated by reference. More information on clustering events using k-means clustering may be found in U.S. patent application Ser. No. 15/847,799, filed on Dec. 19, 2017, which is incorporated by reference. More information on clustering places and generating place-entity graphs may be found in U.S. patent application Ser. No. 15/192,702, filed on Jun. 24, 2016, which is incorporated by reference. More information on clustering place-entity nodes may be found in U.S. patent application Ser. No. 15/838,287, filed on Dec. 11, 2017, which is incorporated by reference.

Figure 4C:
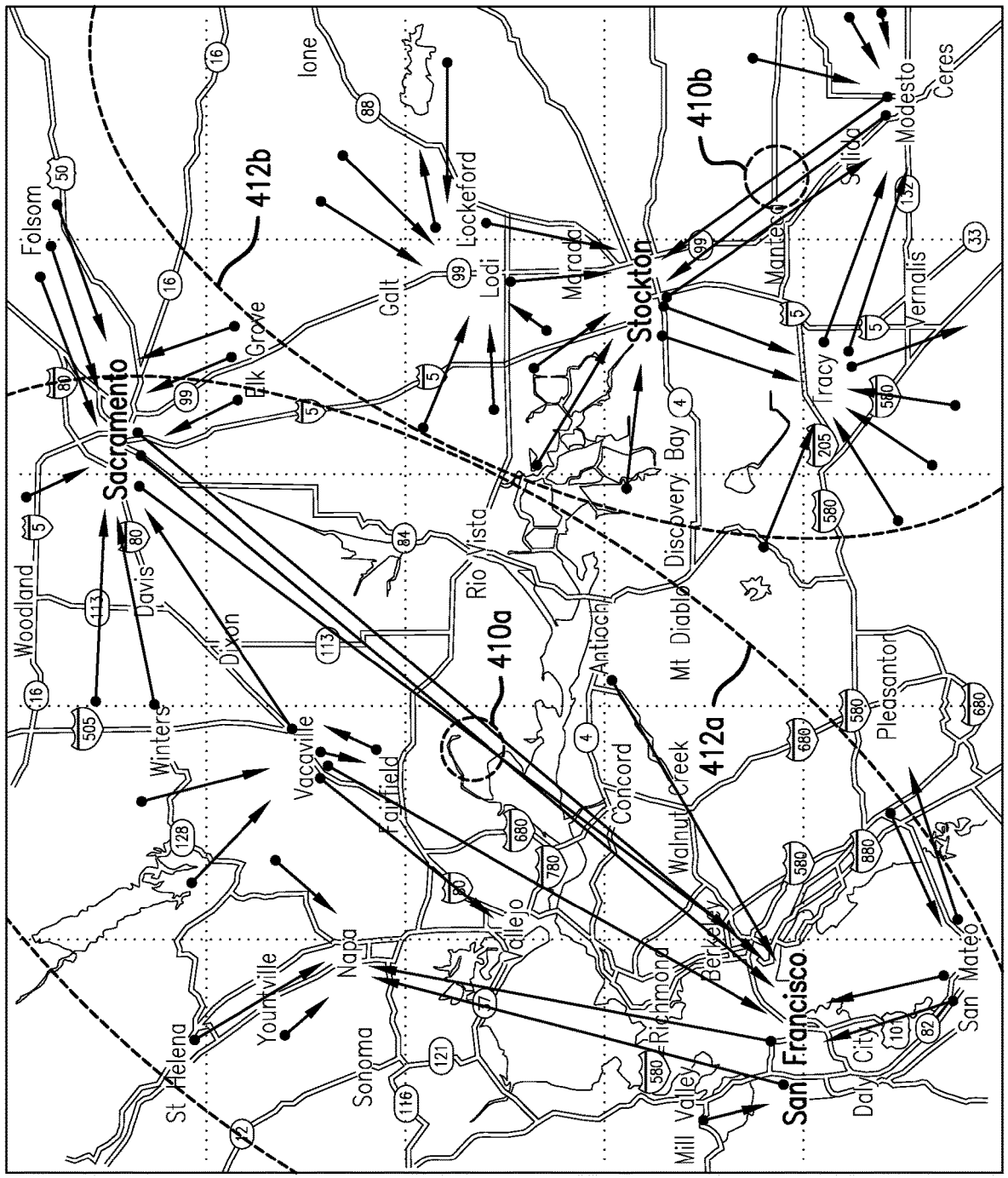

FIG. 4C illustrates a determination of a final geographic location of one or more clusters 412 for a given geographic map 400. In particular embodiments, a process of assigning each vector 404 and calculating new centroids 410 for each cluster 412 may be repeated until a condition for each cluster 412 is met. As an example and not by way of limitation, the process of assigning each vector 404 and calculating new centroids 410 for each cluster 412 may be repeated until a sum of squares for each cluster 412 reaches a minimum. In particular embodiments, a threshold number of repetitions may be run before the k-means clustering algorithm may be ended. Once a final geographic location of each centroid 410 is established, each vector 404 may be assigned to a cluster 412. Clusters 412 may then be used to determine which of the plurality of map tiles 402 are encompassed by each cluster 412. As an example and not by way of limitation, as shown in FIG. 4C, cluster 412a encompasses the map tiles 402 including Pleasanton, Mt. Diablo, Rio Vista, Elk Grove, Folsom, and to the west of those locations. Those map tiles 402 may be assigned to a cluster 412a. In particular embodiments, a map tile 402 may only be assigned to one cluster 412. Given that a map tile 402 is encompassed by two or more clusters 412, then the cluster 412 with the more assigned vectors 404 originating from the particular map tile 402 may have the particular map tile 402 assigned to the cluster 412. As an example and not by way of limitation, the map tile 402 including Pleasanton encompassed by both cluster 412a and cluster 412 may be determined to be assigned to cluster 412b based on the number of vectors 404 originating from the map tile 402 and going into cluster 412b.

Figure 4D:
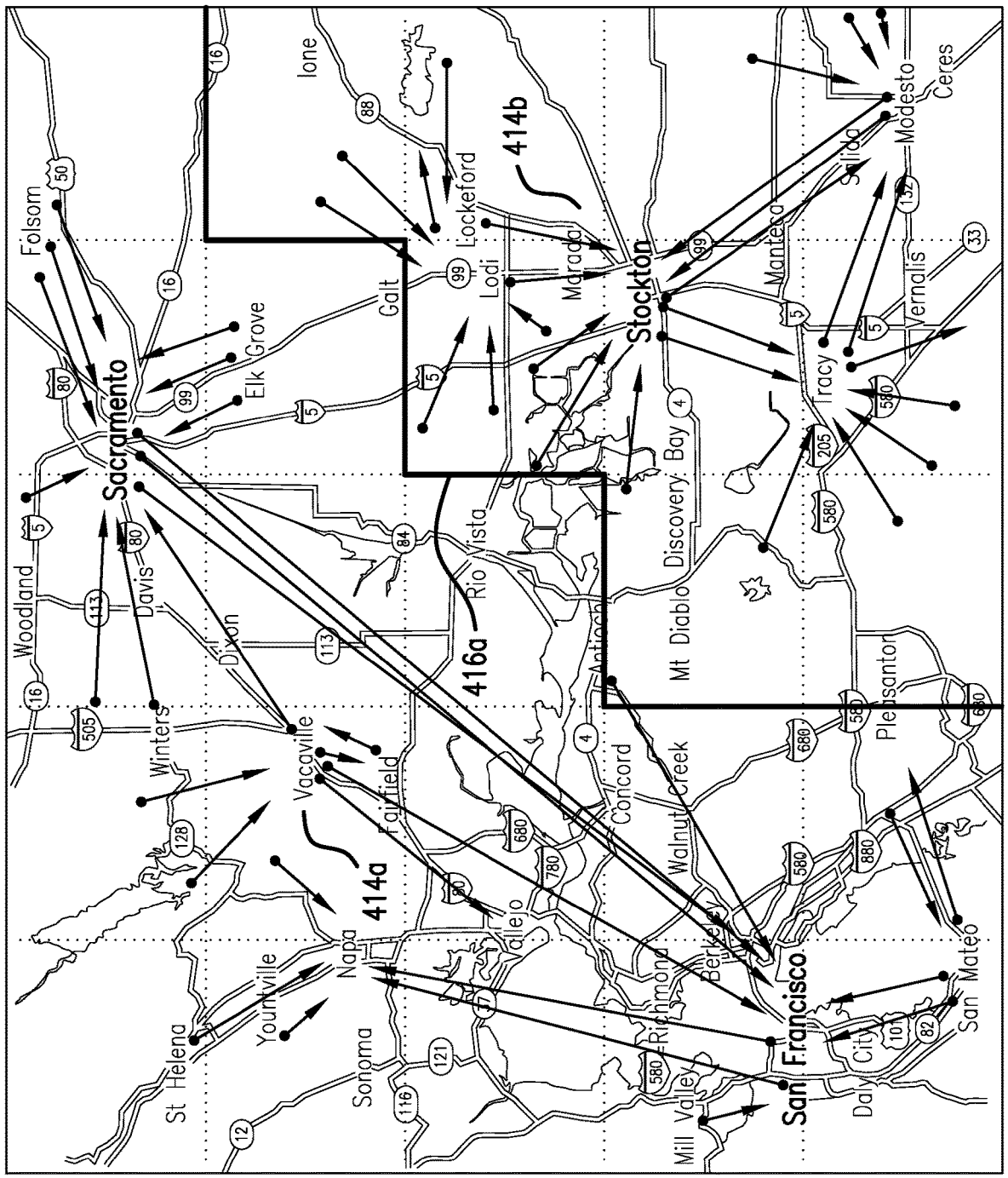

FIG. 4D illustrates a final step of partitioning the geographic map 400 by creating one or more social tiles 414 separated by a border 416. After map tiles 402 are assigned to a cluster 412, as described in reference to FIG. 4C, a social tile 414 may be generated to represent the one or more map tiles 402 assigned to the cluster 412. As an example and not by way of limitation, cluster 412a may form a social tile 414a and cluster 412b may form social tile 414b based on the map tiles 402 assigned to each cluster 412a-412b. In particular embodiments, a border 416 may separate each social tile on a geographic map 400. In particular embodiments, the social tiles 414 may represent a geographic area within which users are likely to attend and/or register for events having geographic locations within the respective social tile 414. As an example and not by way of limitation, for a user 101 within the social tile 414a and located in the Sacramento map tile 402, the user 101 may be recommended events in San Francisco because the user 101 is within the same social tile 414a. However, continuing the example, the same user 101 may not be recommended events in social tile 414b. In particular embodiments, a user 101 may customize which map tiles 402 and/or social tiles 414 that the user 101 may be associated with. A social-tile database may be compiled to include a list of map tiles 402 and a social-tile identifier for each map tile indicating an assignment of each map tile to one social tile. The social-tile database may be accessed to determine which social tile is associated with a particular map tile by looking up the particular map tile in the list of map tiles to find a particular social-tile identifier as discussed with respect to FIG. 6. The size of the social tiles 414 may be dependent on the geographic location of the social tile 414. As an example and not by way of limitation, a more densely populated area may have a smaller social tile as compared to a less densely populated area, and the size of the social tiles 414 may vary as a result.

Figure 5A:
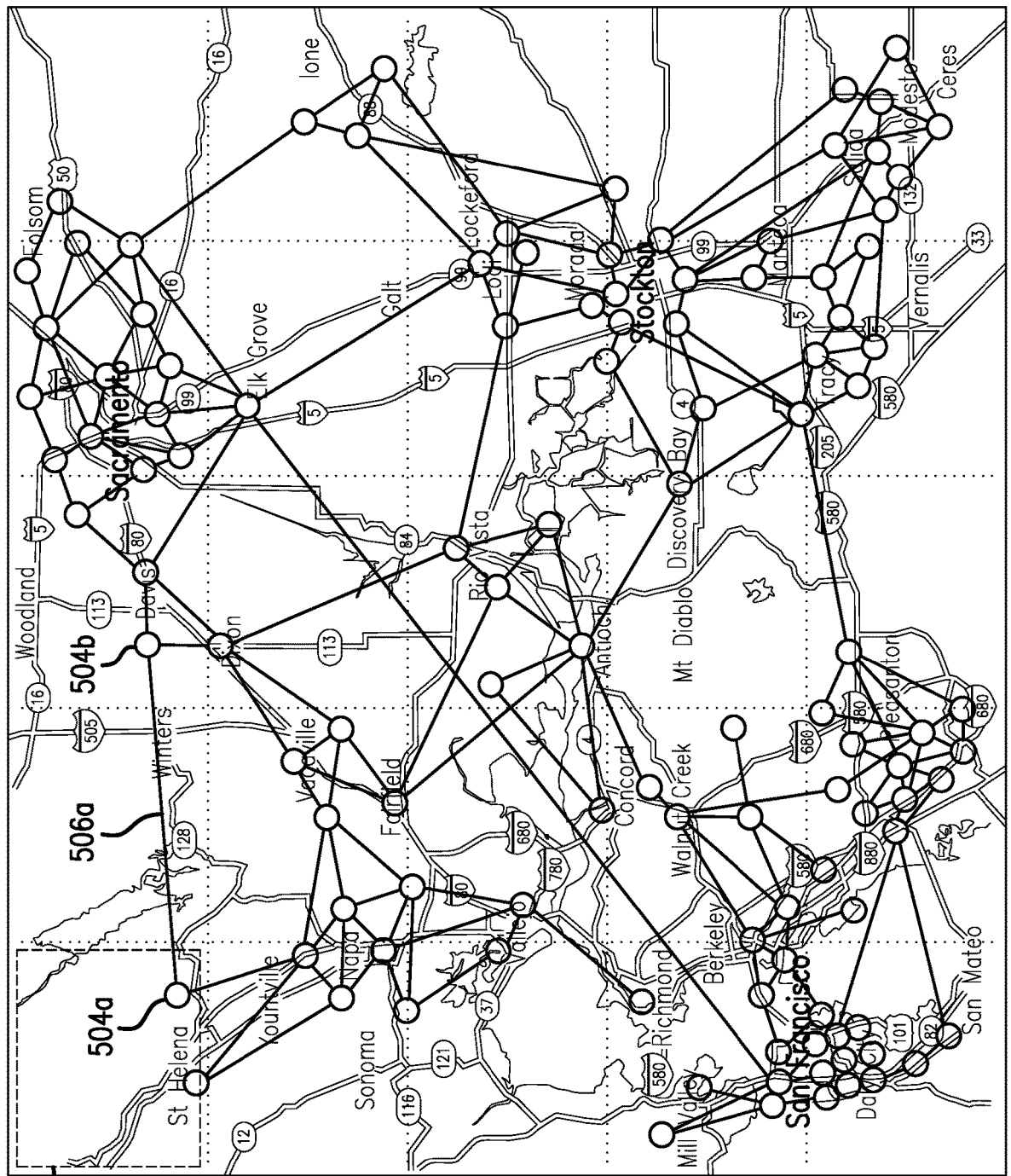
FIGS. 5A-5D illustrate an example of partitioning a geographic map using social signals between events.

FIG. 5A illustrates another example of partitioning a geographic map 500 into a plurality of social tiles and clustering a plurality of map tiles 502 into one of the plurality of social tiles. Similarly to the partitioning process described for FIGS. 4A-4D, any one of the client system 130, social-networking system 160, third-party system, or server system 180 may perform a geographic partitioning of the geographic map 500 and the geographic map 500 may be determined similarly to geographic map 400. As an example and not by way of limitation, the geographic map 500 may include a plurality of map tiles 502, one of which is map tile 502a, which includes a geographic area north of St. Helena. The geographic map 500 may include an event graph that overlays the geographic map 500. The event graph may include a plurality of vertices 504 that represent the geographic locations of prior events and a plurality of edges 506 connecting the vertices 504. In particular embodiments, an edge 506 may represent a social signal between two vertices 504, such as the number of co-attendees of both events corresponding to the two vertices 504. An event database may be accessed to generate the event graph onto the geographic map 500. As an example and not by way of limitation, the event database may be accessed to determine all of the events that have taken place within the geographic map 500 and plotted as vertices 504 indicative of the locations of each prior event that occurred within the geographic map 500. Each of the edges plotted on the geographic map 500 may have an edge weight, which is the value associated with the edge for a given factor. As an example and not by way of limitation, given an edge 506a relates to the co-attendees between two vertices 504a-504b, then the edge weight may be determined based on the number of co-attendees between the two events corresponding to the two vertices 504a-504b. Continuing the example, vertex 504a may represent an event (e.g., Salsa Night) in one map tile and vertex 504b may represent another event (e.g., rock climbing) in another map tile. In particular embodiments, the edges 506 may represent the number of people who have registered for both events corresponding to the vertices 504. Any reference to co-attendees may also refer to the number of people who have registered to attend the respective events.

Figure 5B:
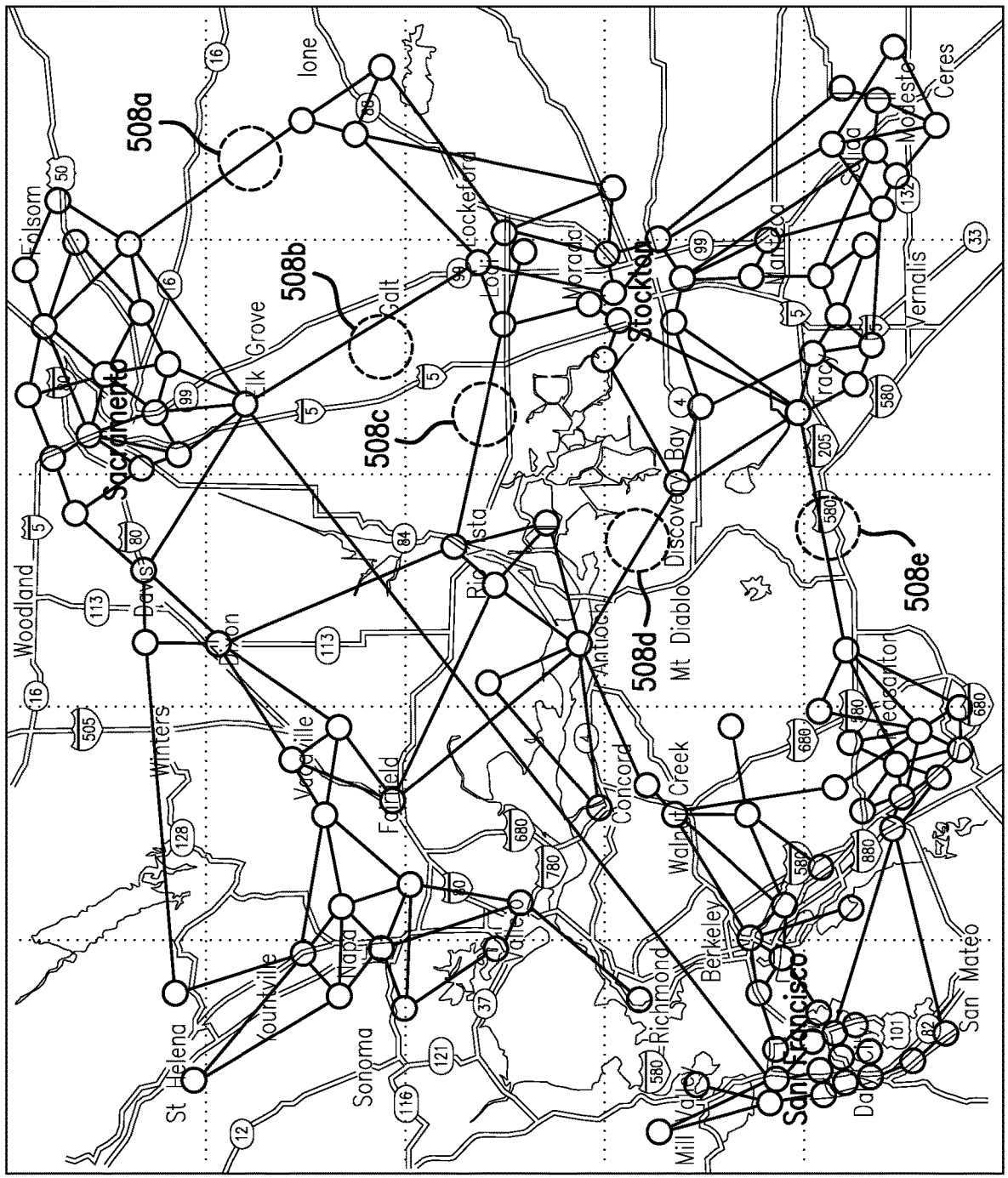

FIG. 5B illustrates an identification step of partitioning the geographic map 500. An edge value may be determined by factoring in the number of edges in a given area. As an example and not by way of limitation, an edge value may be determined between St. Helena and Napa and include the edges 506 between the vertices 504 located in St. Helena and Napa. Continuing the example, given there are three edges 506 located between St. Helena and Napa and each edge has an edge weight of 100 (e.g., number of co-attendees for each event), then the edge value may be a sum of the edge weights (e.g. 300). In particular embodiments, a factor may be added to determine the edge value. As an example and not by way of limitation, a factor of 2 may be introduced to indicate there is a strong association between the two locations given there are many co-attendees for a given area. Alternatively, any factor may be introduced, and a scaling factor may be included. In particular embodiments, one or more edges 508a-508e that have edge weights that fall below a predetermined threshold may be identified on the geographic map 500. The edge value may be determined after identifying the edges 508a-508e and identifying any edges 506 within a geographic area (e.g., within a certain distance from the edges 508a-508e). The identified edges 508a-508e may be determined to be "weak" edges that may be indicative of a weak association between two geographic areas based on a low number of users willing to travel between the areas to attend events. In particular embodiments, no edges 506 between two geographic areas may also indicate an area of separation between the two geographic areas. Subsequently to identifying the edges 508a-508e, one or more partitions 510a-510b may be generated based on the identified edges 508a-508e.

Figure 5C:
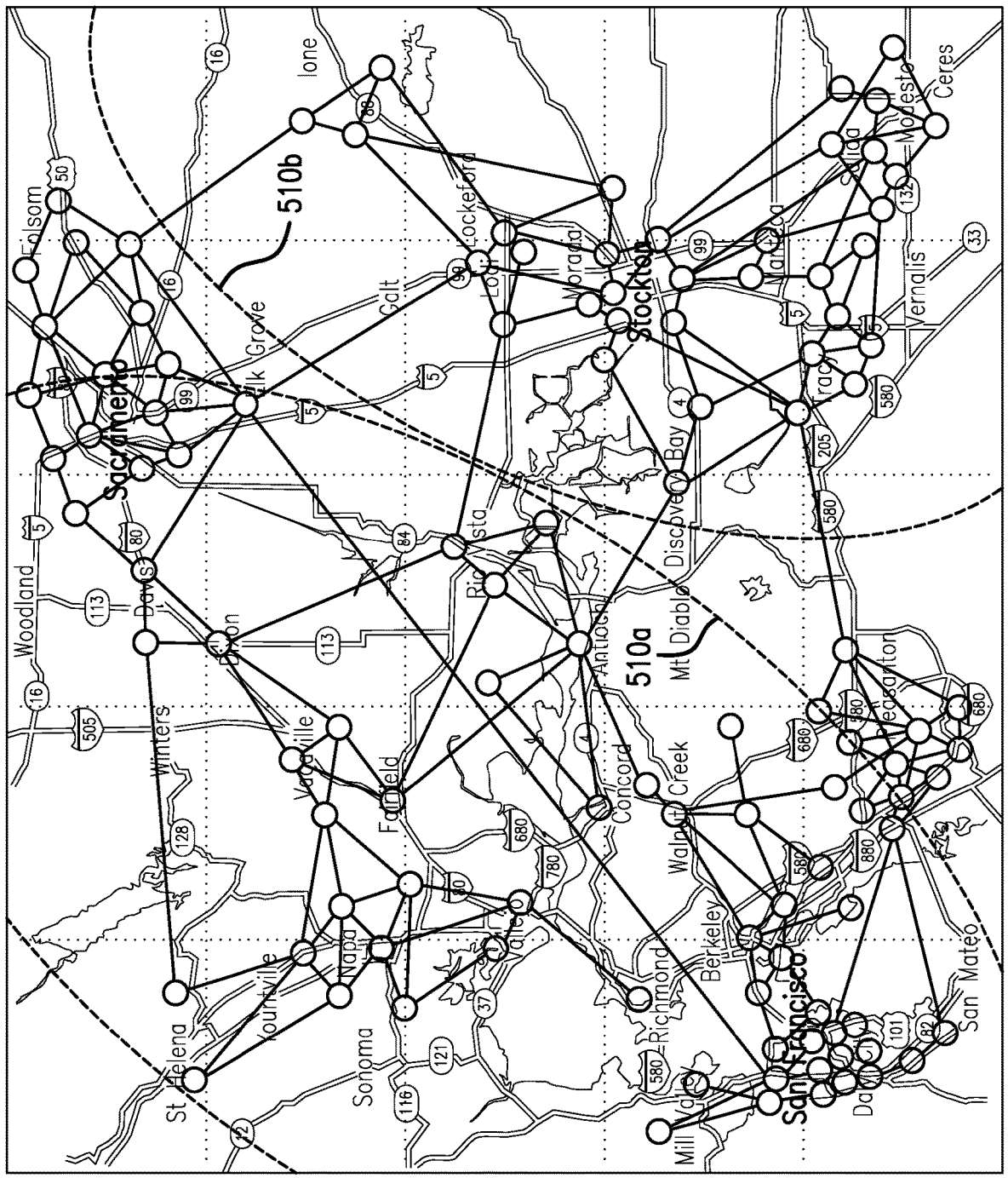

FIG. 5C illustrates a generation of partitions 510 on the geographic map 500 based on identified edges 508a-508e. The generated partitions 510a-510b may include a plurality of map tiles 502. Each of the map tiles 502 may be assigned to a partition 510. As an example and not by way of limitation, the map tile 502 including Modesto would be assigned to partition 510b. If one or more partitions 510 overlap a map tile 502, the partition 510 that has a higher edge value may have the particular map tile 502 assigned to the respective partition 510. As an example and not by way of limitation, the map tile 502 including Pleasanton that is overlapped by both partitions 510a-510b, may be determined to be assigned to partition 510a based on the edges 506 associating the map tile 502 more with partition 510a.

Figure 5D:
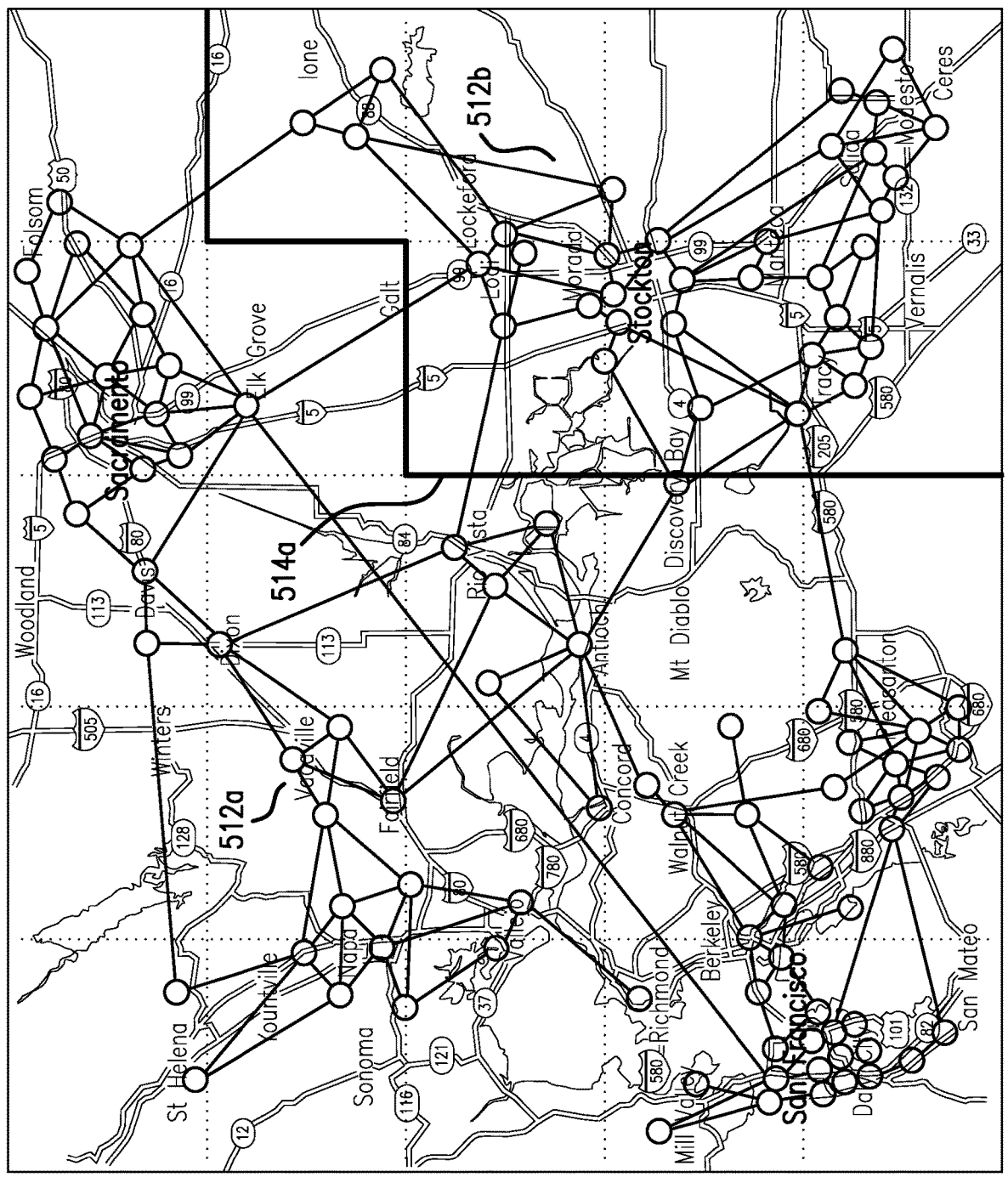

FIG. 5D illustrates a final step of partitioning the geographic map 500 by creating one or more social tiles 512 separated by a border 514. After map tiles 502 are assigned to a partition 510, as described in reference to FIG. 5C, a social tile 512 may be generated to represent the one or more map tiles 502 assigned to the partition 510. As an example and not by way of limitation, partition 510a may form social tile 512a and partition 510b may form social tile 512b, which are divided by a border 514a. Similarly as described in FIG. 4D, the social tiles 512 are representative of a geographic area that users are willing to travel within to attend events. As an example and not by way of limitation, users within a social tile 512 may be recommended to events within the social tile 512 as described above.

In particular embodiments, users within a social tile 414, 512 may be recommended to register for events within the social tile 414, 512 based on an affinity between a particular user with an event. As an example and not by way of limitation, an affinity may be determined for a user with respect to the location of the event, host of the event, event description, and the like. In particular embodiments, one or more events may be recommended to a user in response to determining an affinity coefficient is above a threshold affinity coefficient. As an example and not by way of limitation, a user may be recommended an event (e.g., Kanye Concert) to attend if the user has a strong affinity (e.g., likes Kanye's music and has attended multiple concerts previously) with the event.

FIG. 6 illustrates a list format of a social-tile database 600 that includes a list of map tiles assigned to a social tile. The social-tile database 600 may include map tile IDs 604 for each specific map tile to identify the particular map tile from all map tiles. While a given geographic map may include a particular map tile number 1 602a, other geographic maps used to generate partitions to form social tiles may reuse map tile numbers 602. A particular map tile ID 604 may be assigned to a particular map tile to distinguish that particular map tile from all other map tiles that may have the same map tile number. As an example and not by way of limitation, for geographic map 400, Map Tile 1 602a may be assigned a map tile ID "078541" 604a, but Map Tile 1 602a of geographic map 500 may be assigned a different map tile ID 604. Continuing the example, Map Tile 1 602a for geographic map 400 may be assigned to Social Tile 1 606a with a Social Tile ID "009752" 608a. Social tile numbers 606 may also be reused similarly to map tile numbers 602. In particular embodiments, map tiles of a partition may be assigned to a social tile as described above. When determining a map tile that a user 101 or an event is associated with, a look up of the social-tile database 600 may be performed. In particular embodiments, a location of a user 101 or event may be determined and used to determine a map tile associated with the location of the user 101 or event. From the map tile associated with the location of the user 101 or event, an associated social tile assigned that the map tile is assigned to may be identified.

FIG. 7 illustrates an example indexing of an event in a social-tile database 700. In particular embodiments, once a new event listing is generated by a user 101 or another entity, an event ID 702 may be assigned to the event listing containing information items 704. The new event listing may also be assigned to a map tile number 706 that has a corresponding map tile ID 708. Similarly to FIG. 6, the map tile ID 708 may be assigned to a particular social tile number 710 that has a social tile ID 712. As an example and not by way of limitation, a user 101 may generate a new event listing located in "Levi's Stadium" with an event ID "8975823" 702 titled "Kanye Concert." Continuing the example, a look up of the location would place the new event listing within Map Tile 4 706 with a Map Tile ID "078544," which is assigned to Social Tile 1 710 with a Social Tile ID "009752" 712. The new event listing may then be stored in the social-tile database 700 as associated with the social tile ID "009752" 712. In particular embodiments, when a user 101 is querying for new event recommendations, a social-tile database 700 may be accessed to identify event listings located within the same social tile. Although this disclosure discusses indexing an event in a social-tile database 700, this may also be applied to indexing new users 101 to associate a user 101 with a social tile. As an example and not by way of limitation, a specific user ID may be assigned to the user 101 and mapped to a map tile and social tile similarly as a new event listing. In particular embodiments, the user 101 may be reassigned when determined to be in a new social tile than previously assigned. Users 101 may be indexed with one or more items of user information associated with the respective user 101. The user information may include at least the social tile associated with the geographic location of the respective user 101.

Figure 8A:
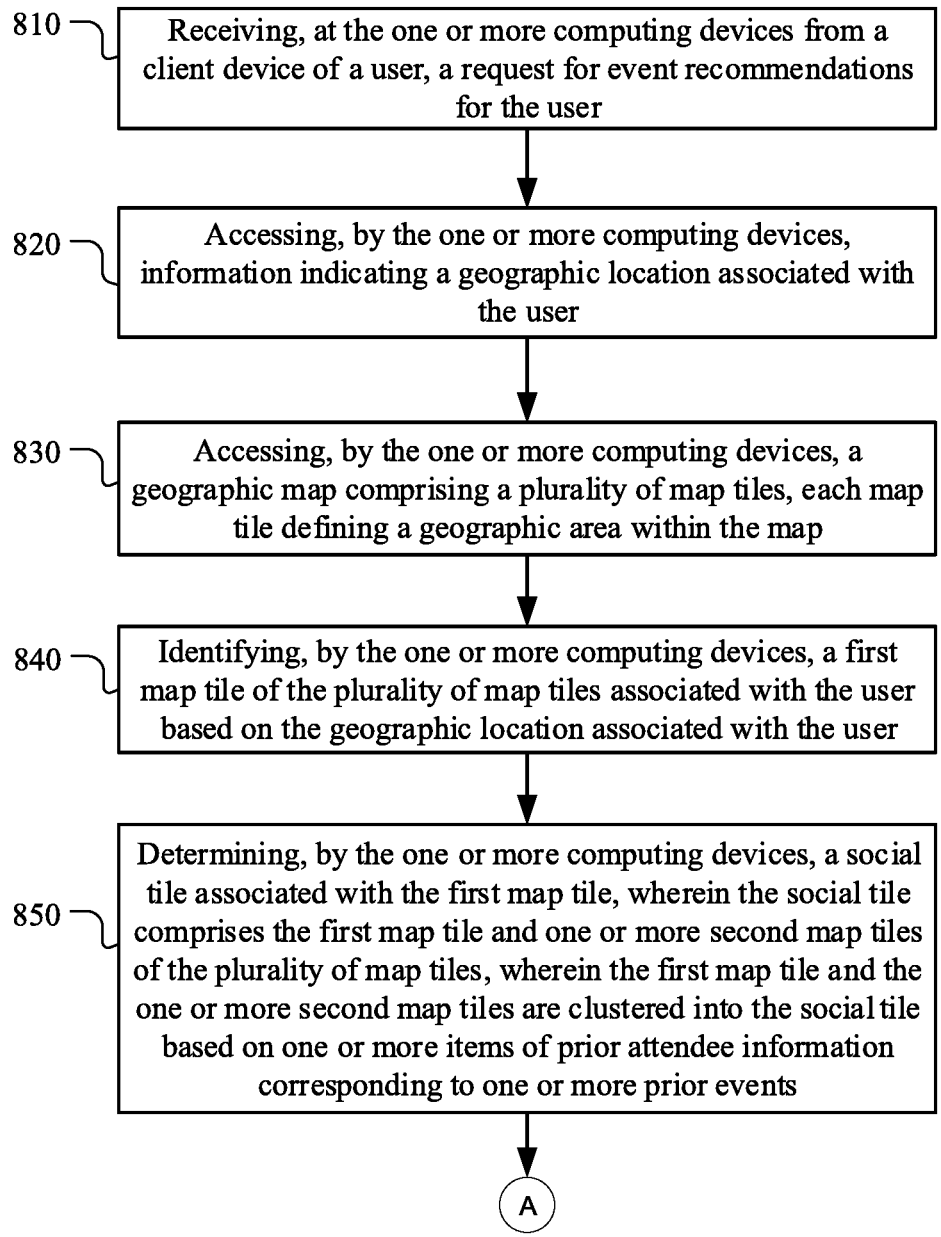
FIGS. 8A and 8B illustrate an example method for recommending one or more events to a user.
Figure 8B:
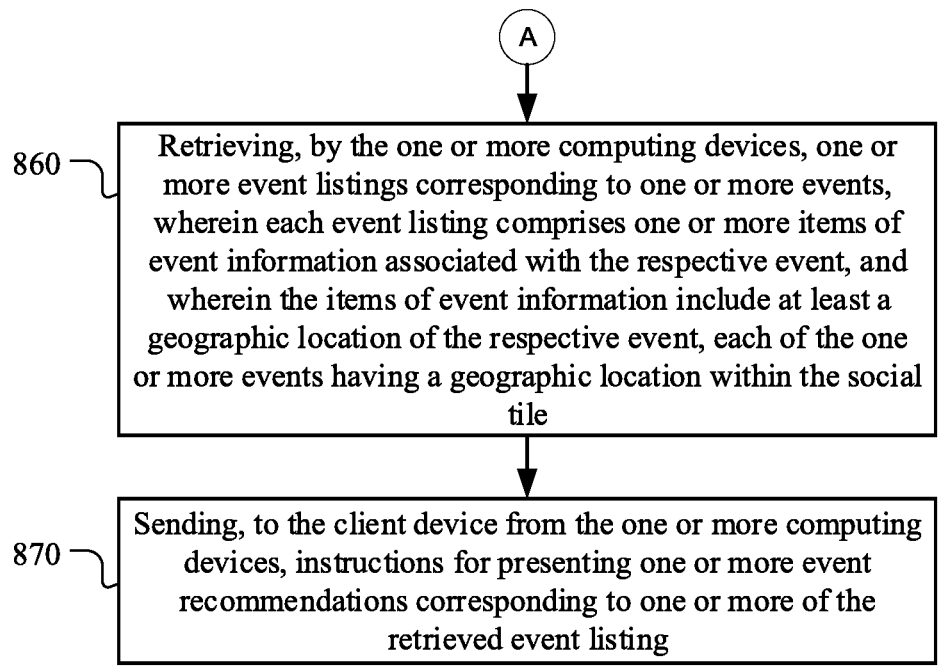

FIGS. 8A and 8B illustrates an example method 800 for generating event recommendations for a user within a social tile. The method may begin at step 810, where the social-networking system 160 may receive, at the one or more computing devices from a client system 130 of a user 101, a request for event recommendations for the user 101. At step 820, the social-networking system 160 may access, by the one or more computing devices, information indicating a geographic location associated with the user 101. At step 830, the social-networking system 160 may access, by the one or more computing devices, a geographic map comprising a plurality of map tiles, each map tile defining a geographic area within the map. At step 840, the social-networking system 160 may identify, by the one or more computing devices, a first map tile of the plurality of map tiles associated with the user 101 based on the geographic location associated with the user 101. At step 850, the social-networking system 160 may determine, by the one or more computing devices, a social tile associated with the first map tile, wherein the social tile comprises the first map tile and one or more second map tiles of the plurality of map tiles, wherein the first map tile and the one or more second map tiles are clustered into the social tile based on one or more items of prior attendee information corresponding to one or more prior events. At step 860, the social-networking system 160 may retrieve, by the one or more computing devices, one or more event listings corresponding to one or more events, wherein each event listing comprises one or more items of event information associated with the respective event, and wherein the items of event information include at least a geographic location of the respective event, each of the one or more events having a geographic location within the social tile. At step 870, the social-networking system 160 may send, to the client system 130 from the one or more computing devices, instructions for presenting one or more event recommendations corresponding to one or more of the retrieved event listing. Particular embodiments may repeat one or more steps of the method of FIG. 8, where appropriate. Particular embodiments may continue after step 870 to another step (not shown) or restart the method. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating event recommendations for a user within a social tile including the particular steps of the method of FIG. 8, this disclosure contemplates any suitable method for generating event recommendations for a user within a social tile including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 9:
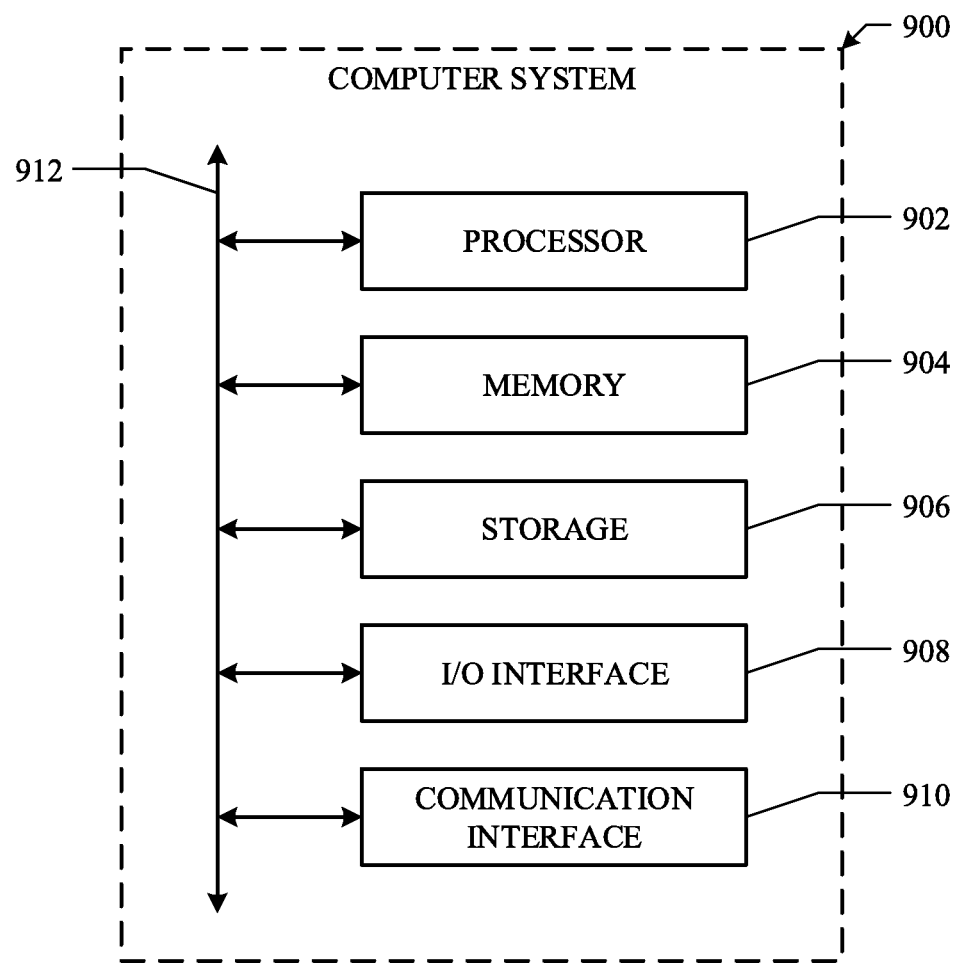
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
    receiving, at the one or more computing devices from a client system of a user, a request for event recommendations for the user associated with a geographic location;

accessing, by the one or more computing devices, a geographic map comprising a plurality of map tiles, each map tile defining a geographic area within the map;

determining, by the one or more computing devices, a first map tile of the plurality of map tiles associated with the user based on the geographic location associated with the client system of the user;

identifying, by the one or more computing devices, a first social tile associated with the first map tile from among a plurality of social tiles, wherein the first social tile is identified based on a predetermined mapping of the first map tile to the first social tile, wherein the first social tile comprises the first map tile and one or more second map tiles of the plurality of map tiles, wherein the first map tile and the one or more second map tiles are clustered into the first social tile based on a machine-learning analysis of one or more items of prior attendee information corresponding to one or more prior events, wherein each social tile of the plurality of social tiles is associated with a set of event listings out of a plurality of event listings;

retrieving, by the one or more computing devices from a data store, one or more event listings corresponding to one or more events based on the first social tile, wherein each event listing comprises one or more items of event information associated with the respective event, and wherein the items of event information include at least a geographic location of the respective event, each of the one or more events having a geographic location within the first social tile; and sending, to the client system from the one or more computing devices, instructions for presenting one or more event recommendations corresponding to one or more of the retrieved event listings corresponding to one or more events having a geographic location within the first social tile.

2. The method of claim 1, wherein the request for event recommendations includes a request for social event recommendations of an online social network, wherein the social event recommendations correspond to event listings that one or more of the user's friends have registered to attend.

3. The method of claim 1, wherein the geographic location associated with the user includes at least one of a Global Positioning System (GPS) signal of the client system, check-in information associated with the user, or a geographic location of an Internet Protocol (IP) address associated with the client system.

4. The method of claim 1, wherein determining the first map tile associated with the user comprises matching the geographic location associated with the user to a map tile of the plurality of map tiles that encompasses the geographic location associated with the user.

5. The method of claim 1, wherein determining the social tile associated with the first map tile comprises:

accessing a social-tile database that includes a list of map tiles and a social-tile identifier for each map tile indicating an assignment of each map tile to one social tile of a plurality of social tiles; and identifying the social tile associated with the first map tile by looking up the first map tile in the list of map tiles to find the social-tile identifier of the social tile assigned to the first map tile.

6. The method of claim 1, further comprising partitioning the geographic map into a plurality of social tiles by:

accessing, by the one or more computing devices, an event database for a plurality of prior event listings corresponding to a plurality or prior events, respectively, wherein each prior event listing comprises items of event information indicating at least a geographic location and attendee information of the respective prior event;

clustering, by the one or more computing devices, the plurality of map tiles of the geographic map into a plurality of social tiles, each social tile comprising one or more map tiles, the map tiles being clustered into a particular social tile based on the geographic location and attendee information of respective prior events within the map tiles, wherein each social tile represents a geographic area within which users associated with one of the map tiles clustered into the respective social tile are likely to register for events having geographic locations within the respective social tile; and assigning, by the one or more computing devices, for each map tile, a map-tile identifier of the respective map tile to a social-tile identifier of the respective social tile the map tile is clustered in to.

7. The method of claim 6, further comprising:

determining, by the one or more computing devices, a number of social tiles to be generated from the geographic map;

generating, by the one or more computing devices for each past event, a plurality of vectors indicative of the geographic location of an attendee of a prior event to the geographic location of the respective prior event;

performing, by the one or more computing devices, a k-means clustering algorithm on the plurality of vectors to cluster the plurality of vectors into a number of clusters, wherein the number of clusters is determined from the number of social tiles; and determining, by the one or more computing devices, a plurality of partitions of the geographic map based on the clusters of the plurality of vectors.

8. The method of claim 7, further comprising:

selecting, by the one or more computing devices, an initial centroid for each cluster of the number of clusters corresponding to a geographic location on the geographic map;

assigning, by the one or more computing devices, each vector of the plurality of vectors to a cluster that includes a centroid that is closest to the respective vector;

calculating, by the one or more computing devices, a new centroid for each cluster of the number of clusters based on the vectors of the plurality of vectors assigned to the respective cluster; and updating, by the one or more computing devices, a geographic location of each cluster of the number of clusters based on the new centroid of each cluster.

9. The method of claim 8, further comprising repeating the assigning of each vector of the plurality of vectors and the calculating of new centroids for each cluster until a sum of squares for each cluster reaches a minimum.

10. The method of claim 6, further comprising:

generating, by the one or more computing devices, an event graph that overlays the geographic map, the event graph comprising a plurality of vertices that represent the geographic locations of the respective prior events and a plurality of edges connecting the vertices, wherein each edge represents a social signal between two vertices;

determining, by the one or more computing devices, an edge weight of an edge between two vertices of the plurality of vertices based on the number of attendees that attended the corresponding events related to the two vertices;

calculating, by the one or more computing devices for a geographic area on the geographic map, an edge value based on the edge weight and a number of edges;

identifying, by the one or more computing devices, one or more geographic areas that have an edge value below a predetermined threshold edge value; and determining, by the one or more computing devices, a plurality of partitions of the geographic map based on the one or more geographic areas that have the edge value below the predetermined threshold edge value.

11. The method of claim 10, further comprising:
identifying, by the one or more computing devices, one or more edges of the plurality of edges that have an edge weight below a threshold edge weight;

generating, by the one or more computing devices, the geographic area comprising a predetermined distance area from the identified one or more edges with the edge weight below the threshold edge weight; and calculating, by the one or more computing devices, the edge value of the generated geographic area.

12. The method of claim 10, further comprising:
identifying, by the one or more computing devices, the one or more vertices that are connected to a first edge with a first edge weight that is below the threshold edge weight;

determining, by the one or more computing devices, the one or more geographic locations associated with the one or more vertices connected to the first edge; and generating, by the one or more computing devices, a plurality of partitions based on the geographic locations associated with the one or more vertices connected to the first edge.

13. The method of claim 6, wherein the size of each of the plurality of social tiles are based on the geographic location of the social tile.

14. The method of claim 6, further comprising:
establishing, by the one or more computing devices, one or more geographic boundaries to define a plurality sub-areas, wherein each particular sub-area of the plurality of sub-areas defines a particular geographic area of the geographic map.

15. The method of claim 14, wherein the one or more geographic boundaries include a body of water or a mountainous area.

16. The method of claim 1, further comprising:
accessing, by the one or more computing devices, information indicating a geographic location associated with a new user;

determining, by the one or more computing devices, a second map tile of the plurality of map tiles associated with the new user based on the geographic location associated with the new user;

identifying, by the one or more computing devices, a second social tile associated with the second map tile; and indexing, by the one or more computing devices, one or more items of user information associated with the new user based on the second social tile, wherein the items of user information include at least the second social tile associated with the geographic location of the new user.

17. The method of claim 1, further comprising:
adding, by the one or more computing devices to an event database, a new event listing corresponding to a new event, wherein the new event listing comprises one or more items of event information associated with the new event, and wherein the items of event information include at least a geographic location of the new event;

determining, by the one or more computing devices, a second map tile of the plurality of map tiles associated with the new event listing based on the geographic location of the new event;

identifying, by the one or more computing devices, a second social tile associated with the second map tile; and indexing, by the one or more computing devices, the new event listing in the event database with an identifier of the second social tile.

18. The method of claim 1, wherein the items of event information further include a category and a page identifier (ID) of the respective event.

19. The method of claim 18, wherein retrieving the one or more event listings further comprises:
accessing, by the one or more computing devices, a user attendance history of the user, wherein the user attendance history comprises one or more prior event listings corresponding to one or more events that the user has attended;

identifying, by the one or more computing devices, the category of each prior event listing;

querying, by the one or more computing devices, an event database for one or more event listings corresponding to one or more events that match the one or more identified categories; and retrieving, by the one or more computing devices, the one or more event listings corresponding to one or more events that match the one or more identified categories and that have geographic locations within the social tile.

20. The method of claim 18, wherein retrieving the one or more event listings further comprises:
accessing, by the one or more computing devices, a user attendance history of the user, wherein the user attendance history comprises one or more prior event listings corresponding to one or more events that the user has attended;

identifying, by the one or more computing devices, the page ID of each prior event listing;

querying, by the one or more computing devices, an event database for one or more event listings corresponding to one or more events that match the one or more identified page IDs; and retrieving, by the one or more computing devices, the one or more event listings corresponding to one or more events that match the one or more identified page IDs and that have geographic locations within the social tile.

21. A method of claim 1, further comprising:
determining a social affinity of the user with respect to each of the one or more of the retrieved event listings; and ranking the one or more retrieved event listings based on the social affinity of the respective event listings, wherein the instructions for presenting the one or more event recommendations further comprises presenting the one or more retrieved event listings based on the ranking.

22. One or more computer-readable non-transitory storage media embodying software that is operable when executed to:

receive, from a client system of a user, a request for event recommendations for the user associated with a geographic location;

access a geographic map comprising a plurality of map tiles, each map tile defining a geographic area within the map;

determine a first map tile of the plurality of map tiles associated with the user based on the geographic location associated with the client system of the user;

identify a first social tile associated with the first map tile from among a plurality of social tiles, wherein the first social tile is identified based on a predetermined mapping of the first map tile to the first social tile, wherein the first social tile comprises the first map tile and one or more second map tiles of the plurality of map tiles, wherein the first map tile and the one or more second map tiles are clustered into the first social tile based on a machine-learning analysis of one or more items of prior attendee information corresponding to one or more prior events, wherein each social tile of the plurality of social tiles is associated with a set of event listings out of a plurality of event listings;

retrieve, from a data store, one or more event listings corresponding to one or more events based on the first social tile, wherein each event listing comprises one or more items of event information associated with the respective event, and wherein the items of event information include at least a geographic location of the respective event, each of the one or more events having a geographic location within the first social tile; and send, to the client system, instructions to present one or more event recommendations corresponding to one or more of the retrieved event listings corresponding to one or more events having a geographic location within the first social tile.

23. A system comprising: one or more processors; and a non-transitory memory coupled to the processors comprising instructions executable by the processors, the processors operable when executing the instructions to:

receive, from a client system of a user, a request for event recommendations for the user associated with a geographic location;

access a geographic map comprising a plurality of map tiles, each map tile defining a geographic area within the map;

determine a first map tile of the plurality of map tiles associated with the user based on the geographic location associated with the client system of the user;

identify a first social tile associated with the first map tile from among a plurality of social tiles, wherein the first social tile is identified based on a predetermined mapping of the first map tile to the first social tile, wherein the first social tile comprises the first map tile and one or more second map tiles of the plurality of map tiles, wherein the first map tile and the one or more second map tiles are clustered into the first social tile based on a machine-learning analysis of one or more items of prior attendee information corresponding to one or more prior events, wherein each social tile of the plurality of social tiles is associated with a set of event listings out of a plurality of event listings;

retrieve, from a data store, one or more event listings corresponding to one or more events based on the first social tile, wherein each event listing comprises one or more items of event information associated with the respective event, and wherein the items of event information include at least a geographic location of the respective event, each of the one or more events having a geographic location within the first social tile; and send, to the client system, instructions to present one or more event recommendations corresponding to one or more of the retrieved event listings corresponding to one or more events having a geographic location within the first social tile.

* * * * *